United States Patent
Watanabe

(10) Patent No.: US 11,027,174 B2
(45) Date of Patent: Jun. 8, 2021

(54) MULTI-PIECE SOLID GOLF BALL

(71) Applicant: Bridgestone Sports Co., Ltd., Tokyo (JP)

(72) Inventor: Hideo Watanabe, Saitamaken (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 16/998,546

(22) Filed: Aug. 20, 2020

(65) Prior Publication Data
US 2021/0060387 A1    Mar. 4, 2021

(30) Foreign Application Priority Data
Sep. 4, 2019    (JP) .............. JP2019-161361

(51) Int. Cl.
*A63B 37/06*    (2006.01)
*A63B 37/00*    (2006.01)

(52) U.S. Cl.
CPC .... *A63B 37/00922* (2020.08); *A63B 37/0043* (2013.01); *A63B 37/0051* (2013.01); *A63B 37/0062* (2013.01); *A63B 37/0064* (2013.01); *A63B 37/00222* (2020.08)

(58) Field of Classification Search
CPC ............ A63B 37/0092; A63B 37/0062; A63B 37/0063
USPC ........................................ 473/376
See application file for complete search history.

(56) References Cited

U.S. PATENT DOCUMENTS

| | | | |
|---|---|---|---|
| 2008/0146376 A1 | 6/2008 | Watanabe | |
| 2009/0111608 A1 | 4/2009 | Watanabe et al. | |
| 2009/0170634 A1 | 7/2009 | Loper et al. | |
| 2010/0234138 A1* | 9/2010 | Watanabe | A63B 37/0004 473/373 |
| 2013/0029787 A1* | 1/2013 | Watanabe | A63B 37/0033 473/373 |
| 2018/0236311 A1* | 8/2018 | Watanabe | A63B 37/0084 |

FOREIGN PATENT DOCUMENTS

| | | |
|---|---|---|
| JP | 2008-149131 A | 7/2008 |
| JP | 2009-095365 A | 5/2009 |
| JP | 2009-095369 A | 5/2009 |

* cited by examiner

*Primary Examiner* — Raeann Gorden
(74) *Attorney, Agent, or Firm* — Sughrue Mion, PLLC

(57) ABSTRACT

In a multi-piece solid golf ball having a core, an envelope layer, an intermediate layer and a cover, the core is formed primarily of a base rubber and has a diameter set in a specific range, the envelope layer, intermediate layer and cover are each formed of resin materials, and the envelope layer is formed into two layers—an inner layer and an outer layer. The center and surface hardnesses of the core, the surface hardness of the inner envelope layer-encased sphere, the surface hardness of the outer envelope layer-encased sphere, the surface hardness of the intermediate layer-encased sphere and the surface hardness of the ball together satisfy a specific relationship. This ball achieves a satisfactory distance on full shots both with a driver and with irons, in addition to which it is superior in the short game and has a good feel at impact and an excellent scuff resistance.

12 Claims, 2 Drawing Sheets

MULTI-PIECE SOLID GOLF BALL

CROSS-REFERENCE TO RELATED APPLICATION

This non-provisional application claims priority under 35 U.S.C. § 119(a) on Patent Application No. 2019-161361 filed in Japan on Sep. 4, 2019, the entire contents of which are hereby incorporated by reference.

TECHNICAL FIELD

The present invention relates to a multi-piece solid golf ball having five or more layers, including a core, an inner envelope layer, an outer envelope layer, an intermediate layer and a cover.

BACKGROUND ART

A variety of golf balls have hitherto been developed for professional golfers and skilled amateurs. Of these, multi-piece solid golf balls having an optimized hardness 20 relationship among the layers encasing the core are in widespread use because they provide both a superior distance performance in the high head-speed range and also a good controllability on iron shots and approach shots. Given that not only the flight performance, but also the feel of the ball at impact and the spin rate of the ball after being struck by a club strongly influence control of the ball, optimizing the thicknesses and 25 hardnesses of the golf ball layers in order to achieve the best possible feel and spin rate is also an important topic in golf ball development. Finally, because there exists a desire for the ball to have durability to repeated impact and for scuffing observed on the ball surface when a golf ball is repeatedly hit with different clubs to be suppressed (increased scuff resistance), maximal protection of the ball from external factors is yet another important 30 topic in golf ball development.

Numerous golf balls having a five-piece construction consisting of a core encased by four layers—an inner envelope layer, an outer envelope layer, an intermediate layer and a cover (outermost layer)—and having specific hardness relationships and thickness relationships among these layers are described in the art. Examples include JP-A 2008-149131 (and the corresponding U.S. Published Patent Application No. 2008/146376), JP-A 2009-095365 (U.S. Published Patent Application No. 2009/111608), JP-A 2009-095369 and U.S. Published Patent Application No. 2009/170634.

However, in these golf balls, there is still room for improvement in optimization of the core hardness profile and the thickness relationship among the layers. That is, as golf ball products for professional golfers and skilled amateurs, there remains room for improvement in achieving a better flight performance and in increasing the spin rate on approach shots so as to obtain a high controllability.

SUMMARY OF THE INVENTION

It is therefore an object of the present invention to provide a multi-piece solid golf ball which, along with achieving a satisfactory distance on full shots not only with a driver (W #1) but also with long and middle irons, is highly receptive to spin on approach shots and thus superior in the short game, and also has a good feel at impact and an excellent scuff resistance.

As a result of extensive investigations, I have discovered that when a multi-piece solid golf ball having a core, an envelope layer, an intermediate layer and a cover is constructed such that the core is formed primarily of a base rubber, the core diameter is set to at least 30 mm, the envelope layer, intermediate layer and cover are each formed of like or unlike resin materials and the envelope layer is formed into two layers—an inner layer and an outer layer, and the ball is produced such that the surface hardness relationship among these various layers satisfies the following condition:

> center hardness of core<surface hardness of core<surface hardness of inner envelope layer-encased sphere<surface hardness of outer envelope layer-encased sphere<surface hardness of intermediate layer-encased sphere>surface hardness of ball (the hardnesses of these layers being Shore C hardness values)

and the Shore C hardness value obtained by subtracting the core center hardness from the surface hardness of the outer envelope layer-encased sphere is 36 or more, the spin rate on shots with a driver (W #1) and on shots with various middle- and long-irons can be further reduced and a high initial velocity on shots can be achieved, enabling a good distance to be obtained. In addition, the spin rate on approach shots in the short game is optimized, increasing the ball controllability, and a good scuff resistance can also be obtained.

Accordingly, in a first aspect, the invention provides a multi-piece solid golf ball having a core, an envelope layer, an intermediate layer and a cover, wherein the core is formed primarily of a base rubber and has a diameter of at least 30 mm; the envelope layer and the intermediate layer are each formed of a resin material and the cover is formed primarily of a urethane resin; the envelope layer is formed into two layers—an inner layer and an outer layer; the core has a center hardness and a surface hardness, the sphere obtained by encasing the core with the inner envelope layer (inner envelope layer-encased sphere) has a surface hardness, the sphere obtained by encasing the inner envelope layer-encased sphere with the outer envelope layer (outer envelope layer-encased sphere) has a surface hardness, the sphere obtained by encasing the outer envelope layer-encased sphere with the intermediate layer (intermediate layer-encased sphere) has a surface hardness and the ball has a surface hardness which together satisfy the following relationship in which the hardnesses are Shore C hardness values:

> core center hardness<core surface hardness<surface hardness of inner envelope layer-encased sphere<surface hardness of outer envelope layer-encased sphere<surface hardness of intermediate layer-encased sphere>ball surface hardness;

and the Shore C hardness value obtained by subtracting the core center hardness from the surface hardness of the outer envelope layer-encased sphere is 36 or more.

In a preferred embodiment of the multi-piece solid golf ball of the invention, the hardnesses (Shore C hardness) of the respective encased spheres and the thicknesses (mm) of the respective layers satisfy the following relationship:

> (surface hardness of ball×cover thickness)+(surface hardness of intermediate layer-encased sphere×intermediate layer thickness)+(surface hardness of outer envelope layer-encased sphere×thickness of outer envelope layer)+(surface hardness of inner envelope layer-encased sphere×thickness of inner envelope layer)≤[(surface hardness of core+center hardness of core)/2]×core radius.

In the same preferred embodiment, the sum expressed as (surface hardness of ball×cover thickness)+(surface hardness of intermediate layer-encased sphere× intermediate layer thickness)+(surface hardness of outer envelope layer-encased sphere× thickness of outer envelope layer)+(surface hardness of inner envelope layer-encased sphere× thickness of inner envelope layer) may have a value of from 300 to 600.

In another preferred embodiment of the multi-piece solid golf ball of the invention, the surface hardnesses of the core and the inner envelope layer-encased sphere satisfy the following condition:

1≤surface hardness of inner envelope layer-encased sphere−surface hardness of core≤20.

In yet another preferred embodiment of the golf ball of the invention, the surface hardnesses of the inner envelope layer-encased sphere and the outer envelope layer-encased sphere satisfy the following condition:

1≤surface hardness of outer envelope layer-encased sphere−surface hardness of inner envelope layer-encased sphere≤20.

In still another preferred embodiment, the surface hardnesses of the outer envelope layer-encased sphere and the intermediate layer-encased sphere satisfy the following condition:

1≤surface hardness of intermediate layer-encased sphere−surface hardness of outer envelope layer-encased sphere≤20.

In a further preferred embodiment, the core has an interior hardness which, letting Cc be the Shore C hardness at the core center, C5 be the Shore C hardness at a position 5 mm from the core center, Cs be the Shore C hardness at the core surface and Cs-2 be the Shore C hardness at a position 2 mm inside the core surface, satisfies the condition Cs−Cc≥13. The interior hardness of the core may further satisfy the condition Cs−Cs-2≤4 and/or may further satisfy the condition C5−Cc≥Cs−Cs-2.

In a still further preferred embodiment, the core is formed of a rubber composition which includes (a) a base rubber, (b) a co-crosslinking agent that is an α,β-unsaturated carboxylic acid or a metal salt thereof or both, (c) a crosslinking initiator and (d) a lower alcohol having a molecular weight of less than 200. The content of component (d) may be from 0.5 to 5 parts by weight per 10 parts by weight of the base rubber (a). Component (d) may be a monohydric, dihydric or trihydric alcohol and/or may be butanol, glycerol, ethylene glycol or propylene glycol.

Advantageous Effects of the Invention

The multi-piece solid golf ball of the invention, along with achieving a satisfactory distance on full shots not only with a driver (W #1) but also with long and middle irons, is highly receptive to spin on approach shots and thus superior in the short game, and also has a good feel at impact and an excellent scuff resistance. Such qualities make this ball highly useful as a golf ball for professional golfers and skilled amateurs.

BRIEF DESCRIPTION OF THE DIAGRAMS

DESCRIPTION OF THE PREFERRED EMBODIMENTS

The objects, features and advantages of the invention will become more apparent from the following detailed description taken in conjunction with the appended diagrams.

Figure 1:
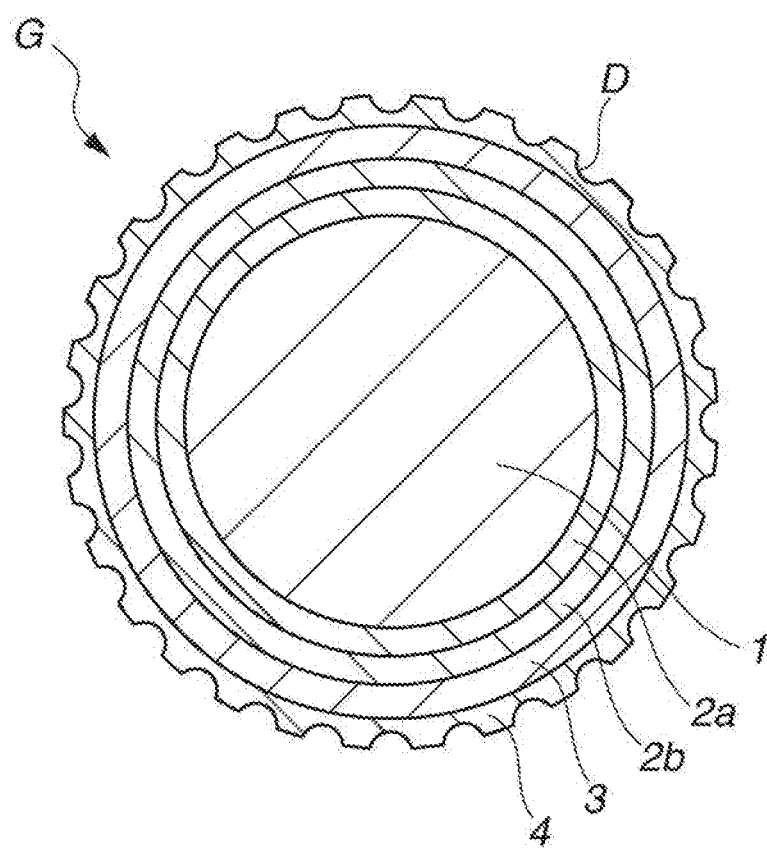
FIG. 1 is a schematic cross-sectional view of the multi-piece solid golf ball (5-piece structure) according to the invention.

Referring to FIG. 1, the multi-piece solid golf ball of the invention is a golf ball G having five or more pieces that include a core 1, an inner envelope layer 2a and outer envelope layer 2b encasing the core 1, an intermediate layer 3 encasing the envelope layers, and a cover 4 encasing the intermediate layer 3. Numerous dimples D are typically formed on the surface of the cover 4. Although not shown in the diagram, a coating layer is generally applied onto the surface of the cover 4. Apart from the coating layer, the cover 4 is positioned as the outermost layer in the layered structure of the golf ball. The core 1, intermediate layer 3 and cover 4 are each not limited to a single layer and may be independently formed of a plurality of two or more layers.

The core has a diameter of at least 30.0 mm. The diameter is preferably at least 31.0 mm, and more preferably at least 31.5 mm. The diameter upper limit is preferably not more than 35.0 mm, more preferably not more than 34.0 mm, and even more preferably not more than 33.5 mm. When the core diameter is too large, the spin rate on full shots with a driver (W #1) or an iron may rise, as a result of which the desired distance may not be achieved. On the other hand, when the core diameter is too small, the spin rate on full shots ma rise or the initial velocity on impact may decrease, as a result of which a good distance may not be achieved.

The core has a deflection (mm) when compressed under a final load of 1,275 N (130 kgf) from an initial load of 98 N (10 kgf) which, although not particularly limited, is preferably at least 4.0 mm, more preferably at least 4.4 mm, and even more preferably at least 4.8 mm. The core deflection upper limit is preferably not more than 6.0 mm, and more preferably not more than 5.5 mm. When the core deflection is too small, i.e., when the core is too hard, the spin rate of the ball may rise excessively, resulting in a poor distance, or the feel at impact may be too hard. On the other hand, when the core deflection is too large, i.e., when the core is too soft, the ball rebound may be too low, resulting in a poor distance, the feel at impact may become too soft, or the durability to cracking on repeated impact may worsen.

The core can be obtained by vulcanizing a rubber composition made up primarily of a rubber material. This rubber composition is typically obtained by using a base rubber as the primary ingredient and compounding with this a co-crosslinking agent, an organic peroxide, an inert filler, an organosulfur compound and the like. In this invention, it is preferable to form a rubber composition containing ingredients (a) to (d) below:

(a) a base rubber,
(b) a co-crosslinking agent which is an α,β-unsaturated carboxylic acid and/or a metal salt thereof,
(c) a crosslinking initiator, and
(d) a lower alcohol having a molecular weight below 200.

Ingredients other than components (a) to (d), such as sulfur, organosulfur compounds, fillers and antioxidants, may be optionally included in the rubber composition.

It is preferable to use a polybutadiene as the base rubber serving as component (a). Commercial products may be used as the polybutadiene. Illustrative examples include BR01, BR51 and BR730 (all products of JSR Corporation). The proportion of polybutadiene within the base rubber is preferably at least 60 wt %, and more preferably at least 80 wt %. Rubber ingredients other than the above polybutadienes may be included in the base rubber, provided that doing so does not detract from the advantageous effects of the invention. Examples of rubber ingredients other than the above polybutadienes include other polybutadienes, and other diene rubbers such as styrene-butadiene rubbers, natural rubbers, isoprene rubbers and ethylene-propylene-diene rubbers.

The co-crosslinking agent serving as component (b) is an $\alpha,\beta$-unsaturated carboxylic acid and/or a metal salt thereof. Specific examples of unsaturated carboxylic acids include acrylic acid, methacrylic acid, maleic acid and fumaric acid. The use of acrylic acid or methacrylic acid is especially preferred. Metal salts of unsaturated carboxylic acids are exemplified by, without particular limitation, the above unsaturated carboxylic acids that have been neutralized with desired metal ions. Specific examples include the zinc salts and magnesium salts of methacrylic acid and acrylic acid. The use of zinc acrylate is especially preferred.

The unsaturated carboxylic acid and/or metal salt thereof is included in an amount, per 100 parts by weight of the base rubber, which is typically at least 5 parts by weight, preferably at least 9 parts by weight, and more preferably at least 13 parts by weight. The upper limit is typically not more than 60 parts by weight, preferably not more than 50 parts by weight, and more preferably not more than 40 parts by weight. Too much may make the core too hard, giving the ball an unpleasant feel at impact, whereas too little may lower the rebound.

It is preferable to use an organic peroxide as the crosslinking initiator serving as component (c). Commercial products may be used as the organic peroxide. Examples of such products that may be suitably used include Percumyl D, Perhexa C-40 and Perhexa 3M (all from NOF Corporation), and Luperco 231XL (from AtoChem Co.). One of these may be used alone, or two or more may be used together. The amount of organic peroxide included per 100 parts by weight of the base rubber is preferably at least 0.1 part by weight, more preferably at least 0.3 part by weight, and even more preferably at least 0.5 part by weight. The upper limit is preferably not more than 5 parts by weight, more preferably not more than 4 parts by weight, even more preferably not more than 3 parts by weight, and most preferably not more than 2.5 parts by weight. When too much or too little is included, it may not be possible to obtain a ball having a good feel, durability and rebound.

Next, component (d) is a lower alcohol having a molecular weight below 200. Here, "alcohol" refers to a substance having one or more alcoholic hydroxyl group; substances obtained by the polycondensation of polyhydric alcohols having two or more hydroxyl groups are also included among such alcohols. "Lower alcohol" refers to an alcohol having a small number of carbon atoms; that is, an alcohol having a low molecular weight. By including this lower alcohol in the rubber composition, when the rubber composition is vulcanized (cured), a cured rubber product (core) having the desired core hardness profile can be obtained and a reduction in the spin rate of the ball when struck is fully achieved, enabling the ball to be endowed with an excellent flight performance.

A monohydric, dihydric or trihydric alcohol (an alcohol having one, two or three alcoholic hydroxyl groups) is especially preferred as the lower alcohol. Specific examples include, but are not limited to, methanol, ethanol, propanol, butanol, ethylene glycol, diethylene glycol, propylene glycol, dipropylene glycol, tripropylene glycol and glycerol. These have a molecular weight below 200, preferably below 150, and more preferably below 100. When the molecular weight is large, i.e., when the number of carbons is too high, the desired core hardness profile cannot be obtained and a reduced spin rate when the ball is struck cannot be fully achieved.

The amount of component (d) included per 100 parts by weight of the base rubber serving as component (a) is preferably at least 0.1 part by weight, and more preferably at least 0.5 part by weight. The upper limit value is preferably 10 parts by weight or less, more preferably 6 parts by weight or less, and even more preferably 3 parts by weight or less. When the content of component (d) is too high, the hardness may decrease and the desired feel, durability and rebound may not be obtained. When the content is too low, the desired core hardness profile may not be obtained and so a reduced spin rate when the ball is struck may not be fully achievable.

Aside from above components (a) to (d), various other additives, such as fillers, antioxidants and organosulfur compounds, may be included, provided that doing so does not detract from the advantageous effects of the invention.

Fillers that may be suitably used include zinc oxide, barium sulfate and calcium carbonate. These may be used singly or two or more may be used in combination. The amount of filler included per 100 parts by weight of the base rubber may be set to preferably at least 1 part by weight, and more preferably at least 3 parts by weight. The upper limit in the amount of filler included per 100 parts by weight of the base rubber may be set to preferably 200 parts by weight or less, more preferably 150 parts by weight or less, and even more preferably 100 parts by weight or less. At a filler content which is too high or too low, a proper weight and a suitable rebound may be impossible to obtain.

Commercial products such as Nocrac NS-6, Nocrac NS-30, Nocrac 200 and Nocrac MB (all products of Ouchi Shinko Chemical Industry Co., Ltd.) may be used as antioxidants. These may be used singly, or two or more may be used in combination.

The amount of antioxidant included per 100 parts by weight of the base rubber, although not particularly limited, is preferably at least 0.05 part by weight, and more preferably at least 0.1 part by weight. The upper limit is preferably 1.0 part by weight or less, more preferably 0.7 part by weight or less, and even more preferably 0.5 part by weight or less. When the antioxidant content is too high or too low, a suitable core hardness gradient may not be obtained, as a result of which it may not be possible to obtain a good rebound, a good durability and a good spin rate-lowering effect on full shots.

In addition, an organosulfur compound may be included in the rubber composition so as to impart an excellent rebound. Thiophenols, thionaphthols, halogenated thiophenols, and metal salts thereof are recommended for this purpose. Illustrative examples include pentachlorothiophenol, pentafluorothiophenol, pentabromothiophenol, p-chlorothiophenol, and the zinc salt of pentachlorothiophenol; and also diphenylpolysulfides, dibenzylpolysulfides, dibenzoylpolysulfides, dibenzothiazoylpolysulfides and dithiobenzoylpolysulfides having 2 to 4 sulfurs. The use of diphenyldisulfide or the zinc salt of pentachlorothiophenol is especially preferred.

The amount of the organosulfur compound included per 100 parts by weight of the base rubber is at least 0.05 part by weight, preferably at least 0.07 part by weight, and more preferably at least 0.1 part by weight. The upper limit is 5 parts by weight or less, preferably 4 parts by weight or less, more preferably 3 parts by weight or less, and most preferably 2 parts by weight or less. Including too much organosulfur compound may excessively lower the hardness, whereas including too little is unlikely to improve the rebound.

Decomposition of the organic peroxide within the core formulation can be promoted by the direct addition of water (or a water-containing material) to the core material. The decomposition efficiency of the organic peroxide within the core-forming rubber composition is known to change with temperature; starting at a given temperature, the decomposition efficiency rises with increasing temperature. If the temperature is too high, the amount of decomposed radicals rises excessively, ultimately leading to recombination between radicals and deactivation. As a result, fewer radicals act effectively in crosslinking. Here, when a heat of decomposition is generated by decomposition of the organic peroxide at the time of core vulcanization, the vicinity of the core surface remains at substantially the same temperature as the temperature of the vulcanization mold, but the temperature near the core center, due to the build-up of heat of decomposition by the organic peroxide which has decomposed from the outside, becomes considerably higher than the mold temperature.

In cases where water (or a water-containing material) is added directly to the core, because the water acts to promote decomposition of the organic peroxide, radical reactions like those described above can be made to differ at the core center and core surface. That is, decomposition of the organic peroxide is further promoted near the center of the core, bringing about greater radical deactivation, which leads to a further decrease in the amount of active radicals. As a result, it is possible to obtain a core in which the crosslink densities at the core center and core surface differ markedly. It is also possible to obtain a core having different dynamic viscoelastic properties at the core center.

The water included in the core material is not particularly limited, and may be distilled water or tap water. The use of distilled water which is free of impurities is especially preferred. The amount of water included per 100 parts by weight of the base rubber is preferably at least 0.1 part by weight, and more preferably at least 0.3 part by weight. The upper limit is preferably not more than 5 parts by weight, and more preferably not more than 4 parts by weight.

The core can be produced by vulcanizing/curing the rubber composition containing the above respective ingredients. For example, production may be carried out by kneading the composition using a mixer such as a Banbury mixer or a roll mill, compression molding or injection molding the kneaded composition using a core mold, and curing the molded material by suitably heating it at a temperature sufficient for the organic peroxide or co-crosslinking agent to act, i.e., between 100° C. and 200° C., preferably between 140° C. and 180° C., for 10 to 40 minutes.

The core may consist only of a single layer, or may be formed as a two-layer core consisting of an inner core layer and an outer core layer. When the core is formed as a two-layer core consisting of an inner core layer and an outer core layer, the inner core layer and outer core layer materials may each be composed primarily of the above-described rubber material. The rubber material making up the outer core layer encasing the inner core layer may be the same as or different from the inner core layer material. Details concerning these rubber materials are the same as those in the above explanation of the ingredients making up the core-forming rubber material.

Next, the hardness profile of the core is described. In the following explanation, the core hardness refers to the Shore C hardness. This Shore C hardness is a hardness value measured with a Shore C durometer in general accordance with ASTM D2240.

The core has a center hardness (Cc) which is preferably at least 47, more preferably at least 49, and even more preferably at least 51. The upper limit is preferably not more than 59, more preferably not more than 56, and even more preferably not more than 53. When this value is too large, the feel at impact may harden, or the spin rate on full shots may rise, as a result of which the intended distance may not be achieved. On the other hand, when this value is too small, the rebound may become lower and so a good distance may not be obtained, or the durability to cracking under repeated impact may worsen.

The core has a surface hardness (Cs) which is preferably at least 70, more preferably at least 73, and even more preferably at least 75. The upper limit is preferably not more than 85, more preferably not more than 83, and even more preferably not more than 80. A core surface hardness outside of this range may lead to undesirable results similar to those described above for the core center hardness (Cc).

The difference between the core surface hardness (Cs) and the core center hardness (Cc) is preferably at least 13, more preferably at least 16, and even more preferably at least 22. The upper limit is preferably not more than 35, more preferably not more than 32, and even more preferably not more than 28. When this value is too small, the ball spin rate-lowering effect on full shots with a driver may be inadequate, resulting in a poor distance. When this value is too large, the initial velocity of the ball on shots may decrease, resulting in a poor distance, or the durability to cracking on repeated impact may worsen.

The hardness at a position 5 mm from the core center (C) is preferably at least 51, more preferably at least 53, and even more preferably at least 55. The upper limit is preferably not more than 62, more preferably not more than 60, and even more preferably not more than 58. Hardness values outside of this range may lead to disadvantageous results similar to those described above with regard to the core center hardness (Cc).

The hardness at a position 2 mm inside the core surface (Cs-2) is preferably at least 68, more preferably at least 70, and even more preferably at least 72. The upper limit is preferably not more than 81, more preferably not more than 78, and even more preferably not more than 77. Hardness values outside of this range may lead to disadvantageous results similar to those described above with regard to the core center hardness (Cc).

The value obtained by subtracting the hardness at a position 2 mm inside the core surface (Cs-2) from the core surface hardness (Cs), which difference is expressed as Cs−Cs-2, is preferably at least 0, more preferably at least 1, and more preferably at least 2. The upper limit is preferably 4 or less, and more preferably 3 or less. When this value is too small, the spin rate of the ball on full shots may rise excessively and a sufficient distance may not be obtained. On the other hand, when this value is too large, the durability of the ball to cracking on repeated impact may worsen.

To increase the durability of the ball to cracking under repeated impact by making the hardness gradient near the surface of the core more gradual than the hardness gradient near the center of the core, it is preferable for the core to satisfy the following condition:

$$C5-Cc \geq Cs-Cs-2.$$

Also, it is desirable to optimize the value expressed as [(Shore C hardness at core surface+Shore C hardness at core center)/2]× core radius (mm), this value preferably being at least 900, more preferably at least 950, and even more preferably at least 1,000. The upper limit is preferably 1,250 or less, more preferably 1,200 or less, and even more preferably 1,150 or less. When this value is too small, the initial velocity of the ball on shots may become lower and so a good distance may not be achieved, or the durability to cracking on repeated impact may worsen. On the other hand, when this value is too large, the feel at impact may become too hard or the spin rate may rise and so a good distance may not be achieved.

Next, the envelope layer is described.

In this invention, the envelope layer is formed of two layers: an inner layer and an outer layer. These are referred to as, respectively, the inner envelope layer and the outer envelope layer.

The inner envelope layer has a material hardness which, although not particularly limited, on the Shore C hardness scale is preferably at least 63, more preferably at least 66, and even more preferably at least 70. The upper limit is preferably not more than 81, more preferably not more than 78, and even more preferably not more than 76. On the Shore D hardness scale, the material hardness is preferably at least 40, more preferably at least 42, and even more preferably at least 44. The upper limit is preferably not more than 52, more preferably not more than 50, and even more preferably not more than 48.

The sphere obtained by encasing the core with the inner envelope layer (inner envelope layer-encased sphere) has a surface hardness which, on the Shore C hardness scale, is preferably at least 71, more preferably at least 74, and even more preferably at least 78. The upper limit is preferably not more than 89, more preferably not more than 86, and even more preferably not more than 84. The surface hardness on the Shore D hardness scale is preferably at least 46, more preferably at least 48, and even more preferably at least 50. The upper limit is preferably not more than 58, more preferably not more than 56, and even more preferably not more than 54.

When the material hardness and surface hardness of the inner envelope layer are lower than the above ranges, the spin rate of the ball on full shots may rise, as a result of which the intended distance may not be achieved. On the other hand, when the material hardness and surface hardness are too high, the feel at impact may become too hard or the durability to cracking on repeated impact may worsen.

The inner envelope layer has a thickness which is preferably at least 1.0 mm, more preferably at least 1.15 mm, and even more preferably at least 1.3 mm. The upper limit in the thickness of the inner envelope layer is preferably 2.1 mm or less, more preferably 1.9 mm or less, and even more preferably 1.7 mm or less. When the inner envelope layer thickness falls outside of this range, the spin rate-lowering effect on shots with a driver (W #1) may be inadequate and a good distance may not be achieved.

The surface hardness (Shore C hardness) of the inner envelope layer-encased sphere multiplied by the thickness (mm) of the inner envelope layer has a value which is preferably at least 70, more preferably at least 85, and even more preferably at least 100. The upper limit is preferably not more than 200, more preferably not more than 175, and even more preferably not more than 150. When this value is too small, the spin rate on full shots may rise and so a good distance may not be obtained. On the other hand, when this value is too large, the feel of the ball at impact may be too hard or the initial velocity on shots may be low, as a result of which a good distance may not be obtained.

The outer envelope layer has a material hardness on the Shore C hardness scale which is preferably at least 74, more preferably at least 77, and even more preferably at least 80. The upper limit is preferably not more than 91, more preferably not more than 89, and even more preferably not more than 86. The surface hardness on the Shore D hardness scale is preferably at least 48, more preferably at least 50, and even more preferably at least 52. The upper limit is preferably not more than 60, more preferably not more than 58, and even more preferably not more than 56.

The sphere obtained by encasing the inner envelope layer-encased sphere with the outer envelope layer (outer envelope layer-encased sphere) has a surface hardness on the Shore C hardness scale which is preferably at least 82, more preferably at least 85, and even more preferably at least 88. The upper limit is preferably not more than 98, more preferably not more than 97, and even more preferably not more than 95. The surface hardness on the Shore D hardness scale is preferably at least 54, more preferably at least 56, and even more preferably at least 58. The upper limit is preferably not more than 66, more preferably not more than 64, and even more preferably not more than 62.

When the material hardness and surface hardness of the outer envelope layer are lower than the above ranges, the spin rate of the ball on full shots may rise, as a result of which the intended distance may not be achieved. On the other hand, when the material hardness and surface hardness are too high, the feel at impact may become too hard or the durability to cracking on repeated impact may worsen.

The outer envelope layer has a thickness which is preferably at least 0.8 mm, more preferably at least 1.0 mm, and even more preferably at least 1.1 mm. The upper limit in the thickness of the outer envelope layer is preferably 1.7 mm or less, more preferably 1.5 mm or less, and even more preferably 1.3 mm or less. When the outer envelope layer thickness falls outside of this range, the spin rate-lowering effect on shots with a driver (W #1) may be inadequate and a good distance may not be achieved.

The value of the surface hardness (Shore C hardness) of the outer envelope layer-encased sphere multiplied by the thickness (mm) of the outer envelope layer is preferably at least 70, more preferably at least 85, and even more preferably at least 100. The upper limit is preferably 200 or less, more preferably 175 or less, and even more preferably 150 or less. When this value is too small, the spin rate on full shots may rise and so a good distance may not be obtained. On the other hand, when this value is too large, the feel at impact may be too hard or the initial velocity on shots may be low and so a good distance may not be obtained.

The materials making up the inner envelope layer and the outer envelope layer are not particularly limited: known resins may be used for this purpose. Examples of preferred materials include resin compositions containing as the essential ingredients: 100 parts by weight of a resin component composed of, in admixture, (A) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and (B) a non-ionomeric thermoplastic elastomer in a weight ratio between 100:0 and 50:50;

(C) from 5 to 120 parts by weight of a fatty acid and/or fatty acid derivative having a molecular weight of from 228 to 1,500; and (D) from 0.1 to 17 parts by weight of a basic inorganic metal compound capable of neutralizing un-neutralized acid groups in components A and C.

Components A to D in the intermediate layer-forming resin material described in, for example, JP-A 2010-253268 may be advantageously used as above components A to D.

The resin materials that form the inner envelope layer and the outer envelope layer may be mutually like or unlike. As subsequently described, in this invention, the surface hardness of the outer envelope layer-encased sphere is higher than the surface hardness of the inner envelope layer-encased sphere. One way to have the resin material of the outer envelope layer be harder than the resin material of the inner envelope layer is to mix a suitable amount of a relatively hard ionomer resin together with the resin material composed of components (A) to (D) above, thereby forming a resin material for the outer envelope layer which differs from the resin material for the inner envelope layer.

A non-ionomeric thermoplastic elastomer may be included in the respective materials for the inner envelope layer and the outer envelope layer. The non-ionomeric thermoplastic elastomer is preferably included in an amount of from 0 to 50 parts by weight per 100 parts by weight of the total amount of the base resin.

Exemplary non-ionomeric thermoplastic elastomers include polyolefin elastomers (including polyolefins and metallocene polyolefins), polystyrene elastomers, diene polymers, polyacrylate polymers, polyamide elastomers, polyurethane elastomers, polyester elastomers and polyacetals.

Depending on the intended use, optional additives may be suitably included in the above resin materials. For example, pigments, dispersants, antioxidants, ultraviolet absorbers and light stabilizers may be added. When these additives are included, the amount added per 100 parts by weight of the overall base resin is preferably at least 0.1 part by weight, and more preferably at least 0.5 part by weight. The upper limit is preferably not more than 10 parts by weight, and more preferably not more than 4 parts by weight.

Next, the intermediate layer is described.

The intermediate layer has a material hardness which, although not particularly limited, on the Shore D hardness scale is preferably at least 60, more preferably at least 63, and even more preferably at least 65. The upper limit is preferably not more than 72, more preferably not more than 70, and even more preferably not more than 68. On the Shore C hardness scale, the material hardness is preferably at least 87, more preferably at least 90, and even more preferably at least 93. The upper limit is preferably not more than 100, more preferably not more than 98, and even more preferably not more than 96.

The sphere obtained by encasing the outer envelope layer-encased sphere with the intermediate layer (intermediate layer-encased sphere) has a surface hardness, on the Shore D hardness scale, which is preferably at least 68, more preferably at least 70, and even more preferably at least 72. The upper limit is preferably not more than 79, more preferably not more than 77, and even more preferably not more than 75. On the Shore C hardness scale, the surface hardness is preferably at least 93, more preferably at least 95, and even more preferably at least 98. The upper limit is preferably not more than 100.

When the material hardness and surface hardness of the intermediate layer are lower than the above respective ranges, the ball rebound on full shots may be inadequate or the spin rate on full shots may rise excessively, resulting in a poor distance. On the other hand, when the material hardness and surface hardness are too high, the durability of the ball to cracking on repeated impact may worsen or the feel at impact may be too hard.

The intermediate layer has a thickness of preferably at least 1.0 mm, more preferably at least 1.1 mm, and even more preferably at least 1.2 mm. The upper limit in the intermediate layer thickness is preferably 1.7 mm or less, more preferably 1.55 mm or less, and even more preferably 1.4 mm or less. It is preferable for the intermediate layer to have a greater thickness than the subsequently described cover (outermost layer). When the intermediate layer thickness falls outside of the above range or the intermediate layer is formed so as to be thinner than the cover, the spin rate-lowering effect on shots with a driver (W #1) may be inadequate and a good distance may not be achieved.

The value obtained by multiplying the surface hardness (Shore C hardness) of the intermediate layer-encased sphere by the thickness (mm) of the outer envelope layer is preferably at least 90, more preferably at least 110, and even more preferably at least 130. The upper limit is preferably not more than 200, more preferably not more than 170, and even more preferably not more than 140. When this value is too small, the spin rate on full shots may rise and a good distance may not be obtained. On the other hand, when this value is too large, the feel at impact may become too hard or the initial velocity on shots may become lower and a good distance may not be achieved.

Various types of thermoplastic resins, especially ionomeric resins, that are used as golf ball materials may be suitably used as the intermediate layer material. Commercial products may be used as the ionomeric resin. Alternatively, the intermediate layer-forming resin material used may be one obtained by blending, of commercially available ionomeric resins, a high-acid ionomeric resin having an acid content of at least 16 wt % with a conventional ionomeric resin. The high rebound and the spin rate-lowering effect obtained with such a blend make it possible to achieve a good distance on shots with a driver (W #1).

The amount of unsaturated carboxylic acid included in the high-acid ionomeric resin (acid content) is typically at least 16 wt %, preferably at least 17 wt %, and more preferably at least 18 wt %. The upper limit is preferably 22 wt % or less, more preferably 21 wt % or less, and even more preferably 20 wt % or less. When this value is too small, the spin rate on full shots may rise, as a result of which the intended distance may not be achieved. On the other hand, when this value is too large, the feel at impact may be too hard or the durability to cracking on repeated impact may worsen.

The amount of high-acid ionomeric resin per 100 wt % of the resin material is preferably at least 10 wt %, more preferably at least 30 wt %, and even more preferably at least 60 wt %. When the amount of such high-acid ionomeric resin included is too low, the spin rate on shots with a driver (W #1) may be high, as a result of which a good distance may not be achieved.

Depending on the intended use, optional additives may be suitably included in the intermediate layer material. For example, pigments, dispersants, antioxidants, ultraviolet absorbers and light stabilizers may be added. When these additives are included, the amount added per 100 parts by weight of the base resin is preferably at least 0.1 part by weight, and more preferably at least 0.5 part by weight. The upper limit is preferably not more than 10 parts by weight, and more preferably not more than 4 parts by weight.

It is desirable to abrade the surface of the intermediate layer in order to increase adhesion of the intermediate layer material with the polyurethane that is preferably used in the subsequently described cover material. In addition, it is desirable to apply a primer (adhesive) to the surface of the intermediate layer following such abrasion treatment or to add an adhesion reinforcing agent to the intermediate layer material.

The intermediate layer material has a specific gravity which is typically less than 1.1, preferably between 0.90 and 1.05, and more preferably between 0.93 and 0.99. Outside of this range, the rebound of the overall ball may decrease and a good distance may not be obtained, or the durability of the ball to cracking on repeated impact may worsen.

Next, the cover (outermost layer) is described.

The cover has a material hardness which, although not particularly limited, on the Shore D hardness scale is preferably at least 25, more preferably at least 35, and even more preferably at least 38. The upper limit is preferably not more than 55, more preferably not more than 50, and even more preferably not more than 45. On the Shore C hardness scale, the material hardness is preferably at least 43, more preferably at least 57, and even more preferably at least 61. The upper limit is preferably not more than 83, more preferably not more than 76, and even more preferably not more than 70.

The surface hardness of the sphere obtained by encasing the intermediate layer-encased sphere with the cover (i.e., the ball), expressed on the Shore D hardness scale, is preferably at least 50, more preferably at least 53, and even more preferably at least 56. The upper limit is preferably not more than 66, more preferably not more than 64, and even more preferably not more than 62. On the Shore C hardness scale, the surface hardness is preferably at least 76, more preferably at least 80, and even more preferably at least 84. The upper limit is preferably not more than 95, more preferably not more than 91, and even more preferably not more than 88.

When the material hardness of the cover and the surface hardness of the ball are too much lower than the above respective ranges, the spin rate of the ball on shots with a driver (W #1) may rise and a good distance may not be achieved. On the other hand, when the material hardness of the cover and the surface hardness of the ball are too high, the ball may not be receptive to spin in the short game or the scuff resistance may worsen.

The cover has a thickness of preferably at least 0.3 mm, more preferably at least 0.45 mm, and even more preferably at least 0.6 mm. The upper limit in the cover thickness is preferably not more than 1.2 mm, more preferably not more than 1.0 mm, and even more preferably not more than 0.8 mm. The thickness of the cover is preferably lower than the thickness of the intermediate layer. When the cover thickness falls outside of the above range or is greater than that of the intermediate layer, the spin rate may rise or the initial velocity of the ball may decrease and a good distance may not be achieved. When the cover is too thin, the ball may not be receptive to spin in the short game or the scuff resistance may worsen.

The value of the surface hardness (Shore C hardness) of the ball multiplied by the thickness (mm) of the cover is preferably at least 50, more preferably at least 60, and even more preferably at least 65. The upper limit is preferably not more than 80, more preferably not more than 75, and even more preferably not more than 70. When the value falls outside this range, the spin rate of the ball in the short game may be inadequate, or the spin rate on full shots may rise, resulting in a poor distance.

Various types of thermoplastic resins and thermoset resins employed as cover stock in golf balls may be used as the cover material. For reasons having to do with ball controllability and scuff resistance, preferred use can be made of a urethane resin. In particular, from the standpoint of the mass productivity of the manufactured balls, it is preferable to use a material that is composed primarily of a thermoplastic polyurethane, and especially preferable to form the cover of a resin blend in which the main components are (I) a thermoplastic urethane and (II) a polyisocyanate compound.

It is recommended that the total weight of components (I) and (II) combined be at least 60%, and preferably at least 70%, of the overall amount of the cover-forming resin blend. Components (I) and (II) are described below.

The thermoplastic polyurethane (I) has a structure which includes soft segments composed of a polymeric polyol (polymeric glycol) that is a long-chain polyol, and hard segments composed of a chain extender and a polyisocyanate compound. Here, the long-chain polyol serving as a starting material may be any that has hitherto been used in the art relating to thermoplastic polyurethanes, and is not particularly limited. Illustrative examples include polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. These long-chain polyols may be used singly, or two or more may be used in combination. Of these, in terms of being able to synthesize a thermoplastic polyurethane having a high rebound resilience and excellent low-temperature properties, a polyether polyol is preferred.

Any chain extender that has hitherto been employed in the art relating to thermoplastic polyurethanes may be suitably used as the chain extender. For example, low-molecular-weight compounds with a molecular weight of 400 or less which have on the molecule two or more active hydrogen atoms capable of reacting with isocyanate groups are preferred. Illustrative, non-limiting, examples of the chain extender include 1,4-butylene glycol, 1,2-ethylene glycol, 1,3-butanediol, 1,6-hexanediol and 2,2-dimethyl-1,3-propanediol. Of these, the chain extender is preferably an aliphatic diol having 2 to 12 carbon atoms, and more preferably 1,4-butylene glycol.

Any polyisocyanate compound hitherto employed in the art relating to thermoplastic polyurethanes may be suitably used without particular limitation as the polyisocyanate compound. For example, use may be made of one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate and dimer acid diisocyanate. However, depending on the type of isocyanate, the crosslinking reactions during injection molding may be difficult to control. In the practice of the invention, to provide a balance between stability at the time of production and the properties that are manifested, it is most preferable to use the following aromatic diisocyanate: 4,4'-diphenylmethane diisocyanate.

Commercially available products may be used as the thermoplastic polyurethane serving as component (I). Illustrative examples include Pandex T-8295, Pandex T-8290 and Pandex T-8260 (all from DIC Covestro Polymer, Ltd.).

A thermoplastic elastomer other than the above thermoplastic polyurethanes may also be optionally included as a separate component, i.e., component (III), together with above components (I) and (II). By including this component (III) in the above resin blend, the flowability of the resin blend can be further improved and properties required of the golf ball cover material, such as resilience and scuff resistance, can be increased.

The compositional ratio of above components (I). (II) and (III) is not particularly limited. However, to fully elicit the advantageous effects of the invention, the compositional ratio (I):(II):(III) is preferably in the weight ratio range of from 100:2:50 to 100:50:0, and more preferably from 100:2:50 to 100:30:8.

In addition, various additives other than the ingredients making up the above thermoplastic polyurethane may be optionally included in this resin blend. For example, pigments, dispersants, antioxidants, light stabilizers, ultraviolet absorbers and internal mold lubricants may be suitably included.

The manufacture of multi-piece solid golf balls in which the above-described core, inner envelope layer, outer envelope layer, intermediate layer and cover (outermost layer) are formed as successive layers may be carried out by a customary method such as a known injection molding process. For example, a multi-piece golf ball can be produced by successively injection-molding the respective materials for the inner envelope layer, outer envelope layer and intermediate layer over the core in injection molds for each layer so as to obtain the respective layer-encased spheres and then, last of all, injection-molding the material for the cover serving as the outermost layer over the intermediate layer-encased sphere. Alternatively, the encasing layers may each be formed by enclosing the sphere to be encased within two half-cups that have been pre-molded into hemispherical shapes and then molding under applied heat and pressure.

Hardness Relationships Among Layers

In the present invention, it is critical for the core to have a center hardness and a surface hardness, for the sphere obtained by encasing the core with the inner envelope layer (inner envelope layer-encased sphere) to have a surface hardness, for the sphere obtained by encasing the inner envelope layer-encased sphere with the outer envelope layer (outer envelope layer-encased sphere) to have a surface hardness, for the sphere obtained by encasing the outer envelope layer-encased sphere with the intermediate layer (intermediate layer-encased sphere) to have a surface hardness and for the ball to have a surface hardness which together satisfy the following relationship:

> core center hardness<core surface hardness<surface hardness of inner envelope layer-encased sphere<surface hardness of outer envelope layer-encased sphere<surface hardness of intermediate layer-encased sphere>ball surface hardness.

By satisfying this hardness relationship, a sufficient distance can be obtained on full shots not only with a driver (W #1) but also with long- and middle-irons, the ball is highly receptive to spin on approach shots and thus superior in the short game, a good feel on impact can be obtained and, moreover, the scuff resistance is excellent.

The Shore C hardness value obtained by subtracting the core center hardness from the surface hardness of the outer envelope layer-encased sphere is 36 or more, preferably 37 or more, and more preferably 38 or more. The upper limit is preferably not more than 45, more preferably not more than 43, and even more preferably not more than 42. When this value is too small, the spin rate on full shots rises and a good distance is not obtained. When this value is too large, the initial velocity on shots may decrease and a good distance may not be obtained, or the durability to cracking under repeated impact may worsen.

The Shore C hardness value obtained by subtracting the core center hardness from the surface hardness of the inner envelope layer-encased sphere is preferably 20 or more, more preferably 25 or more, and even more preferably 28 or more. The upper limit is preferably not more than 40, more preferably not more than 35, and even more preferably not more than 32. When this value is too small, the spin rate on full shots may rise and a good distance may not be obtained. When this value is too large, the initial velocity on shots may decrease and a good distance may not be obtained, or the durability to cracking on repeated impact may worsen.

The Shore C hardness value obtained by subtracting the core center hardness from the surface hardness of the intermediate layer-encased sphere is preferably 40 or more, more preferably 42 or more, and even more preferably 45 or more. The upper limit is preferably not more than 60, more preferably not more than 55, and even more preferably not more than 50. When this value is too small, the spin rate on full shots may rise and a good distance may not be obtained. When this value is too large, the initial velocity on shots may decrease and a good distance may not be obtained, or the durability to cracking on repeated impact may worsen.

The Shore C hardness value obtained by subtracting the core surface hardness from the surface hardness of the inner envelope layer-encased sphere is preferably 1 or more, more preferably 2 or more, and even more preferably 3 or more. The upper limit is preferably not more than 20, more preferably not more than 15, and even more preferably not more than 10. When this hardness difference falls outside of the above range, the spin rate on full shots may rise and a good distance may not be obtained.

The Shore C hardness value obtained by subtracting the surface hardness of the inner envelope layer-encased sphere from the surface hardness of the outer envelope layer-encased sphere is preferably 1 or more, more preferably 2 or more, and even more preferably 3 or more. The upper limit is preferably not more than 20, more preferably not more than 15, and even more preferably not more than 10. When this hardness difference falls outside of the above range, the spin rate on full shots may rise and a good distance may not be obtained.

The Shore C hardness value obtained by subtracting the surface hardness of the outer envelope layer-encased sphere from the surface hardness of the intermediate layer-encased sphere is preferably 1 or more, more preferably 2 or more, and even more preferably 3 or more. The upper limit is preferably not more than 20, more preferably not more than 15, and even more preferably not more than 10. When this hardness difference falls outside of the above range, the spin rate on full shots may rise and a good distance may not be obtained.

The Shore C hardness value obtained by subtracting the surface hardness of the intermediate layer-encased sphere from the surface hardness of the ball is preferably −20 or higher, more preferably −17 or higher, and even more preferably −15 or higher. The upper limit is preferably −2 or lower, more preferably −4 or lower, and even more preferably −6 or lower. When this value is too large on the negative side (too far from zero), the spin rate on full shots may become high and a good distance may not be obtained. On the other hand, when this value is too small on the negative side (to close to zero), the ball may not be receptive to spin on approach shots and so may have a poor short game playability.

The hardnesses (Shore C hardness) of the respective encased spheres and the thicknesses (mm) of the respective layers preferably satisfy the following relationship:

(surface hardness of ball×cover thickness)+(surface hardness of intermediate layer-encased sphere× intermediate layer thickness)+(surface hardness of outer envelope layer-encased sphere×thickness of outer envelope layer)+(surface hardness of inner envelope layer-encased sphere×thickness of inner envelope layer)≤[(surface hardness of core+center hardness of core)/2]×core radius.

When this relationship is not satisfied, the spin rate on full shots may rise and so a good distance may not be obtained.

The sum expressed as (surface hardness of ball−cover thickness)+(surface hardness of intermediate layer-encased sphere× intermediate layer thickness)+(surface hardness of outer envelope layer-encased sphere× thickness of outer envelope layer)+(surface hardness of inner envelope layer-encased sphere× thickness of inner envelope layer) has a value that is preferably at least 300, more preferably at least 350, and even more preferably at least 400. The upper limit is preferably not more than 600, more preferably not more than 550, and even more preferably not more than 500. When this value is too low, the spin rate on full shots may rise and a good distance may not be obtained. On the other hand, when this value is too large, the spin rate on full shots may rise or the initial velocity on shots may decrease, as a result of which a good distance may not be obtained.

Also, letting CM be the hardness at a position midway between the envelope layer surface (surface of the outer envelope layer-encased sphere) and the core center, the value expressed as (surface hardness of outer envelope layer-encased sphere−core center hardness)/(CM−Cc) is preferably at least 2.7, more preferably at least 3.0, and even more preferably at least 3.3. The upper limit is preferably not more than 4.6, more preferably not more than 4.3, and even more preferably not more than 4.0. When this value is small, the spin rate on full shots may rise and a good distance may not be obtained. On the other hand, when this value is large, the initial velocity on shots may decrease and a good distance may not be obtained, or the durability to cracking under repeated impact may worsen.

Numerous dimples may be formed on the outside surface of the cover serving as the outermost layer. The number of dimples arranged on the cover surface, although not particularly limited, is preferably at least 250, more preferably at least 300, and even more preferably at least 320. The upper limit is preferably not more than 380, more preferably not more than 350, and even more preferably not more than 340. When the number of dimples is higher than this range, the ball trajectory may become lower and the distance traveled by the ball may decrease. On the other hand, when the number of dimples is lower that this range, the ball trajectory may become higher and a good distance may not be achieved.

The dimple shapes used may be of one type or may be a combination of two or more types suitably selected from among, for example, circular shapes, various polygonal shapes, dewdrop shapes and oval shapes. When circular dimples are used, the dimple diameter may be set to at least about 2.5 mm and up to about 6.5 mm, and the dimple depth may be set to at least 0.08 mm and up to 0.30 mm.

In order for the aerodynamic properties to be fully manifested, it is desirable for the dimple coverage ratio on the spherical surface of the golf ball, i.e., the dimple surface coverage SR, which is the sum of the individual dimple surface areas, each defined by the flat plane circumscribed by the edge of a dimple, as a percentage of the spherical surface area of the ball were the ball to have no dimples thereon, to be set to at least 70% and not more than 90%. Also, to optimize the ball trajectory, it is desirable for the value Vo, defined as the spatial volume of the individual dimples below the flat plane circumscribed by the dimple edge, divided by the volume of the cylinder whose base is the flat plane and whose height is the maximum depth of the dimple from the base, to be set to at least 0.35 and not more than 0.80. Moreover, it is preferable for the ratio VR of the sum of the volumes of the individual dimples, each formed below the flat plane circumscribed by the edge of the dimple, with respect to the volume of the ball sphere were the ball surface to have no dimples thereon, to be set to at least 0.6% and not more than 1.0%. Outside of the above ranges in these respective values, the resulting trajectory may not enable a good distance to be achieved and so the ball may fail to travel a fully satisfactory distance.

A coating layer may be formed on the surface of the cover. This coating layer can be formed by applying various types of coating materials. Because the coating must be capable of enduring the harsh conditions of golf ball use, it is desirable to use a coating composition in which the chief component is a urethane coating material composed of a polyol and a polyisocyanate.

The polyol component is exemplified by acrylic polyols and polyester polyols.

These polyols include modified polyols. To further increase workability, other polyols may also be added.

It is suitable to use two types of polyester polyols together as the polyol component. In this case, letting the two types of polyester polyol be component (a) and component (b), a polyester polyol in which a cyclic structure has been introduced onto the resin skeleton may be used as the polyester polyol of component (a). Examples include polyester polyols obtained by the polycondensation of a polyol having an alicyclic structure, such as cyclohexane dimethanol, with a polybasic acid; and polyester polyols obtained by the polycondensation of a polyol having an alicyclic structure with a diol or triol and a polybasic acid. A polyester polyol having a branched structure may be used as the polyester polyol of component (b). Examples include polyester polyols having a branched structure, such as NIPPOLAN 800, from Tosoh Corporation.

The polyisocyanate is exemplified without particular limitation by commonly used aromatic, aliphatic, alicyclic and other polyisocyanates. Specific examples include tolylene diisocyanate, diphenylmethane diisocyanate, xylylene diisocyanate, tetramethylene diisocyanate, hexamethylene diisocyanate, lysine diisocyanate, isophorone diisocyanate, 1,4-cyclohexylene diisocyanate, naphthalene diisocyanate, trimethylhexamethylene diisocyanate, dicyclohexylmethane diisocyanate and 1-isocyanato-3,3,5-trimethyl-4-isocyanatomethylcyclohexane. These may be used singly or in admixture.

Depending on the coating conditions, various types of organic solvents may be mixed into the coating composition.

Examples of such organic solvents include aromatic solvents such as toluene, xylene and ethylbenzene: ester solvents such as ethyl acetate, butyl acetate, propylene glycol methyl ether acetate and propylene glycol methyl ether propionate; ketone solvents such as acetone, methyl ethyl ketone, methyl isobutyl ketone and cyclohexanone: ether solvents such as diethylene glycol dimethyl ether, diethylene glycol diethyl ether and dipropylene glycol dimethyl ether; alicyclic hydrocarbon solvents such as cyclohexane, methyl cyclohexane and ethyl cyclohexane; and petroleum hydrocarbon solvents such as mineral spirits.

The thickness of the coating layer made of the coating composition, although not particularly limited, is typically from 5 to 40 μm, and preferably from 10 to 20 μm. As used herein. "coating layer thickness" refers to the coating thickness obtained by averaging the measurements taken at a total of three places: the center of a dimple and two places located at positions between the dimple center and the dimple edge.

In this invention, the coating layer composed of the above coating composition has an elastic work recovery that is preferably at least 60%, and more preferably at least 80%. At a coating layer elastic work recovery in this range, the coating layer has a high elasticity and so the self-repairing ability is high, resulting in an outstanding abrasion resistance. Moreover, the performance attributes of golf balls coated with this coating composition can be improved. The method of measuring the elastic work recovery is described below.

The elastic work recovery is one parameter of the nanoindentation method for evaluating the physical properties of coating layers, this being a nanohardness test method that controls the indentation load on a micro-newton (μN) order and tracks the indenter depth during indentation to a nanometer (nm) precision. In prior methods, only the size of the deformation (plastic deformation) mark corresponding to the maximum load could be measured. However, in the nanoindentation method, the relationship between the indentation load and the indentation depth can be obtained by continuous automated measurement.

Hence, unlike in the past, there are no individual differences between observers when visually measuring a deformation mark under an optical microscope, and so it is thought that the physical properties of the coating layer can be precisely measured. Given that the coating layer on the ball surface is strongly affected by the impact of drivers and other clubs and has a not inconsiderable influence on various golf ball properties, measuring the coating layer by the nanohardness test method and carrying out such measurement to a higher precision than in the past is a very effective method of evaluation.

The hardness of the coating layer, expressed on the Shore M hardness scale, is preferably at least 40, and more preferably at least 60. The upper limit is preferably not more than 95, and more preferably not more than 85. This Shore M hardness is obtained in general accordance with ASTM D2240. The hardness of the coating layer, expressed on the Shore C hardness scale, is preferably at least 40 and has an upper limit of preferably not more than 80. This Shore C hardness is obtained in general accordance with ASTM D2240. At coating layer hardnesses that are higher than these ranges, the coating may become brittle when the ball is repeatedly struck, which may make it incapable of protecting the cover layer. On the other hand, coating layer hardnesses that are lower than the above range are undesirable because the ball surface more readily incurs damage upon striking a hard object.

Letting Hm be the material hardness (Shore C hardness) of the cover and letting Hc be the Shore C hardness of the coating layer, the difference between these hardnesses (Hm−Hc) is preferably −15 or higher, more preferably −10 or higher, and even more preferably −5 or higher. The upper limit is preferably not more than 15, more preferably not more than 10, and even more preferably not more than 5. When this hardness difference is too small, the coating tends to peel off easily when the ball is struck. On the other hand, when this hardness difference is too large, the spin receptivity of the ball in the short game may be poor.

When the above coating composition is used, the formation of a coating layer on the surface of golf balls manufactured by a commonly known method can be carried out via the steps of preparing the coating composition at the time of application, applying the composition to the golf ball surface by a conventional coating operation, and drying the applied composition. The coating method is not particularly limited. For example, spray painting, electrostatic painting or dipping may be suitably used.

The multi-piece solid golf ball of the invention can be made to conform to the Rules of Golf for play. The inventive ball may be formed to a diameter which is such that the ball does not pass through a ring having an inner diameter of 42.672 mm and is not more than 42.80 mm, and to a weight which is preferably between 45.0 and 45.93 g.

EXAMPLES

The following Examples and Comparative Examples are provided to illustrate the invention, and are not intended to limit the scope thereof.

Examples 1 to 6, Comparative Examples 1 to 8

Formation of Core

In Examples 1-3, solid cores were produced by preparing rubber compositions for the respective Examples shown in Table 1, and then molding and vulcanizing the compositions under the vulcanization conditions shown in Table 1.

In Examples 4-6 and Comparative Examples 1 to 8, solid cores are produced by preparing rubber compositions shown in Table 1, as we as the above description.

TABLE 1

| Core formulation | Example | | | | | | Comparative Example | | | | | | | |
|---|---|---|---|---|---|---|---|---|---|---|---|---|---|---|
| (pbw) | 1 | 2 | 3 | 4 | 5 | 6 | 1 | 2 | 3 | 4 | 5 | 6 | 7 | 8 |
| Polybutadiene A | 20 | 20 | 20 | 20 | 20 | 20 | 20 | 20 | 20 | 20 | 20 | 20 | 20 | 20 |
| Polybutadiene B | 80 | 80 | 80 | 80 | 80 | 80 | 80 | 80 | 80 | 80 | 80 | 80 | 80 | 80 |
| Zinc acrylate | 29 | 27 | 25 | 25 | 25 | 31.5 | 29 | 29 | 29 | 29 | 29 | 29 | 29 | 29 |
| Organic peroxide | 0.5 | 0.5 | 0.5 | 0.5 | 0.5 | 1.0 | 0.5 | 0.5 | 0.5 | 0.5 | 0.5 | 0.5 | 0.5 | 0.5 |
| Propylene glycol | 1.5 | 1.5 | 1.5 | 1.5 | 1.5 | | 1.5 | 1.5 | 1.5 | 1.5 | 1.5 | 1.5 | 1.5 | 1.5 |
| Water | | | | | | 0.8 | | | | | | | | |
| Antioxidant (1) | | | | | | 0.1 | | | | | | | | |

TABLE 1-continued

| Core formulation | | Example | | | | | | Comparative Example | | | | | | | |
|---|---|---|---|---|---|---|---|---|---|---|---|---|---|---|---|
| (pbw) | | 1 | 2 | 3 | 4 | 5 | 6 | 1 | 2 | 3 | 4 | 5 | 6 | 7 | 8 |
| Antioxidant (2) | | 0.5 | 0.5 | 0.5 | 0.5 | 0.5 | | 0.5 | 0.5 | 0.5 | 0.5 | 0.5 | 0.5 | 0.5 | 0.5 |
| Zinc oxide | | 39.2 | 39.9 | 40.6 | 38.1 | 46.0 | 38.5 | 39.2 | 44.4 | 39.2 | 39.2 | 39.2 | 39.2 | 39.2 | 87.2 |
| Zinc salt of pentachlorothiophenol | | 1.0 | 1.0 | 1.0 | 1.0 | 1.0 | 1.0 | 1.0 | 1.0 | 1.0 | 1.0 | 1.0 | 1.0 | 1.0 | 1.0 |
| Vulcanization conditions | Temperature (° C.) | 155 | 155 | 155 | 155 | 155 | 155 | 155 | 155 | 155 | 155 | 155 | 155 | 155 | 155 |
| | Time (min) | 20 | 20 | 20 | 20 | 20 | 15 | 15 | 20 | 20 | 20 | 20 | 20 | 20 | 20 |

Details on the ingredients mentioned in Table 1 are given below.
Polybutadiene A: Available under the trade name "BR 01" from JSR Corporation
Polybutadiene B: Available under the trade name "BR 730" from JSR Corporation
Zinc acrylate: "ZN-DA85S" from Nippon Shokubai Co., Ltd.
Organic peroxide; Dicumyl peroxide, available under the trade name "Percumyl D" from NOF Corporation
Propylene glycol: A lower divalent alcohol (molecular weight, 76.1), from Hayashi Pure Chemical Ind., Ltd.
Water: Pure water (from Seiki Chemical Industrial Co., Ltd.)
Antioxidant (1): 2,2'-Methylenebis(4-methyl-6-butylphenol), available under the trade name "Nocrac NS-6" from Ouchi Shinko Chemical Industry Co., Ltd.
Antioxidant (2): 2-Mercaptobenzimidazole, available under the trade name "Nocrac MB" from Ouchi Shinko Chemical Industry Co., Ltd.
Zinc oxide: Available under the trade name "Zinc Oxide Grade 3" from Sakai Chemical Co., Ltd.
Zinc salt of pentachlorothiophenol:
Available from Wako Pure Chemical Industries, Ltd.
Formation of Inner and Outer Envelope Layers
Next, in each of Examples 1-3, an inner envelope layer was formed by injection-molding the inner envelope layer material of formulation No. 1 shown in Table 2 over the core, following which an outer envelope layer was formed by injection-molding the outer envelope layer material of formulation No. 2 shown in Table 2.
In each of Examples 4-6 and Comparative Examples other than Comparative Example 1, an inner envelope layer is formed by injection-molding the inner envelope layer material of formulation No. 1 or No. 2 shown in Table 2 over the core, following which an outer envelope layer is formed by injection-molding the outer envelope layer material of formulation No. 1, No. 2, No. 3 or No. 4 shown in Table 2. In Comparative Example 1, the material of formulation No. 1 in Table 2 is injection-molded over the core to form a single envelope layer (the details are provided in the "Inner envelope layer" section in Table 4).
Formation of Intermediate Layer and Cover (Outermost Layer)
Next, in each of Examples 1-3, an intermediate layer was formed by injection-molding the intermediate layer material of formulation No. 4 shown in Table 2 over the envelope layer-encased sphere obtained above. A cover (outermost layer) was then formed by injection-molding the cover material of formulation No. 5 shown in Table 2 over the resulting intermediate layer-encased sphere in each Example. A plurality of given dimples common to all the Examples and Comparative Examples were formed at this time on the surface of the cover.

In each of Examples 4-6 and Comparative Examples 1-8, an intermediate layer is formed by injection-molding the intermediate layer material of formulation No. 2 or No. 4 shown in Table 2 over the envelope layer-encased sphere obtained above. A cover (outermost layer) is then formed by injection-molding the cover material of formulation No. 5, No. 6, No. 7 or No. 8 shown in Table 2 over the resulting intermediate layer-encased sphere in each Example. A plurality of given dimples common to all the Examples and Comparative Examples are formed at this time on the surface of the cover.

TABLE 2

| Resin composition (pbw) | No. 1 | No. 2 | No. 3 | No. 4 | No. 5 | No. 6 | No. 7 | No. 8 |
|---|---|---|---|---|---|---|---|---|
| Himilan 1605 | 36 | | | | | | | |
| Himilan 1706 | | | 15 | | | | | |
| AM 7318 | | | 85 | | | | | |
| Surlyn 9320 | | | | | | | | 50 |
| Surlyn 8120 | | | | | | | | 50 |
| HPF 2000 | 100 | | 50 | | | | | |
| HPF 1000 | | 64 | 50 | | | | | |
| Polyurethane A | | | | | 100 | | | |
| Polyurethane B | | | | | | 100 | | |
| Polyurethane C | | | | | | | 100 | |
| Trimethylolpropane | | 1.1 | | 1.1 | | | | |

Trade names of the materials in the above table are given below.
Himilan 1605, Himilan 1706, AM 7318:
Ionomers available from Dow-Mitsui Polychemicals Co., Ltd.
Surlyn 9320, Surlyn 8120:
Ionomers available from The Dow Chemical Company
HPF 2000, HPF 1000: Available under the trade mark HPF from The Dow Chemical Company
Polyurethane A: An ether-type thermoplastic polyurethane (Shore D hardness, 40) available as Pandexk from DIC Covestro Polymer, Ltd.
Polyurethane B: An ether-type thermoplastic polyurethane (Shore D hardness, 43) available as Pandex® from DIC Covestro Polymer, Ltd.
Polyurethane C: An ether-type thermoplastic polyurethane (Shore D hardness, 56.5) available as Pandex® from DIC Covestro Polymer, Ltd.
Trimethylolpropane: TMP, available from Tokyo Chemical Industry Co., Ltd.
Formation of Coating Layer
Next, as a coating composition common to all the Examples and Comparative Examples, in each of Examples 1-3, Coating Composition I shown in Table 3 below was applied with an air spray gun onto the surface of the cover (outermost layer) on which numerous dimples had been formed, thereby producing golf balls having a 15 μm-thick coating layer formed thereon.

As to the Examples and Comparative Examples other than Examples 1-3, the golf balls of having a 15 μm-thick coating layer are formed, as well as the above description.

TABLE 3

| Coating composition I (pbw) | Base resin | Polyester polyol (A) | 23 |
| --- | --- | --- | --- |
| | | Polyester polyol (B) | 15 |
| | | Organic solvent | 62 |
| | Curing agent | Isocyanate (HMDI isocyanurate) | 42 |
| | | Solvent | 58 |
| | | Molar blending ratio (NCO/OH) | 0.89 |
| Coating properties | | Elastic work recovery (%) | 84 |
| | | Shore M hardness | 84 |
| | | Shore C hardness | 63 |
| | | Thickness (μm) | 15 |

Polyester Polyol (A) Synthesis Example

A reactor equipped with a reflux condenser, a dropping funnel, a gas inlet and a thermometer was charged with 140 parts by weight of trimethylolpropane, 95 parts by weight of ethylene glycol, 157 parts by weight of adipic acid and 58 parts by weight of 1,4-cyclohexanedimethanol, following which the temperature was raised to between 200 and 240° C. under stirring and the reaction was effected by 5 hours of heating. This yielded Polyester Polyol (A) having an acid value of 4, a hydroxyl value of 170 and a weight-average molecular weight (Mw) of 28,000.

Next, the Polyester Polyol (A) synthesized above was dissolved in butyl acetate, thereby preparing a varnish having a nonvolatiles content of 70 wt %.

The base resin for Coating Composition I in Table 3 was prepared by mixing 23 parts by weight of the above polyester polyol solution together with 15 parts by weight of Polyester Polyol (B) (the saturated aliphatic polyester polyol NIPPOLAN 800 from Tosoh Corporation: weight-average molecular weight (Mw), 1,000; 100% solids) and the organic solvent. This mixture had a nonvolatiles content of 38.0 wt %.

Elastic Work Recovery

The elastic work recovery of the coating material was measured using a coating sheet having a thickness of 50 μm. The ENT-2100 nanohardness tester from Erionix Inc. was used as the measurement apparatus, and the measurement conditions were as follows.

Indenter: Berkovich indenter (material: diamond; angle α: 65.03°)

Load F: 0.2 mN

Loading time: 10 seconds

Holding time: 1 second

Unloading time: 10 seconds

The elastic work recovery was calculated as follows, based on the indentation work $W_{elast}$ (Nm) due to springback deformation of the coating and on the mechanical indentation work $W_{total}$ (Nm).

Elastic work recovery=$W_{elas}/W_{total}$×100(%)

Shore C Hardness and Shore M Hardness

The Shore C hardnesses and Shore M hardnesses in Table 3 above were determined by fabricating the material to be tested into 2 mm thick sheets and stacking three such sheets together to form a test specimen. Measurements were taken using a Shore C durometer and a Shore M durometer in accordance with ASTM D2240.

Various properties of the resulting golf balls, including the internal hardnesses of the core at various positions, the diameters of the core and each of the layer-encased spheres, the thickness and material hardness of each layer, and the surface hardnesses of the respective layer-encased spheres, were evaluated by the following methods. The results are presented in Tables 4 and 5.

Diameters of Core, Inner and Outer Envelope Layer-Encased Spheres and Intermediate Layer-Encased Sphere The diameters at five random places on the surface were measured at a temperature of 23.9±1° C. and, using the average of these measurements as the measured value for a single core, inner envelope layer-encased sphere, outer envelope layer-encased sphere or intermediate layer-encased sphere, the average diameter for ten such spheres was determined.

Ball Diameter

The diameter at 15 random dimple-free areas was measured at a temperature of 23.9±1° C. and, using the average of these measurements as the measured value for a single ball, the average diameter for ten balls was determined.

Core Deflection

A core was placed on a hard plate and the amount of deflection of the core when compressed under a final load of 1,275 N (130 kgf) from an initial load of 98 N (10 kgf) was measured. The amount of deflection refers in each case to the measured value obtained after holding the core isothermally at 23.9° C.

Core Hardness Profile

The indenter of a durometer was set substantially perpendicular to the spherical surface of the core and the surface hardness of the core on the Shore C hardness scale was measured in accordance with ASTM D2240. The P2 Automatic Rubber Hardness Tester (Kobunshi Keiki Co., Ltd.) equipped with a Shore C durometer was used for measuring the hardness. The maximum value was read off as the hardness value. Measurements were all carried out in a 23=2° C. environment. Cross-sectional hardnesses at specific positions of the core—these being the hardness Cc at the center of the core, the hardness Cc+5 at a position 5 mm from the center, the hardness Cs at the surface of the core, the hardness Cs-2 at a position 2 mm inside the surface, and the hardness CM at the midpoint between the core center and the envelope layer—were each measured by perpendicularly pressing the indenter of a durometer against the place to be measured in the flat cross-sectional plane obtained by cutting the core into hemispheres. The measurement results are indicated as Shore C hardness values.

Material Hardnesses (Shore C and Shore D Hardnesses) of Inner and Outer Envelope Layers. Intermediate Layer and Cover The resin materials for each of these layers were molded into sheets having a thickness of 2 mm and left to stand for at least two weeks at a temperature of 23±2° C. Three sheets were stacked together at the time of measurement. The Shore C and Shore D hardnesses of each material were measured using a Shore C durometer and a Shore D durometer in accordance with ASTM D2240. The P2 Automatic Rubber Hardness Tester (Kobunshi Keiki Co., Ltd.) on which a Shore C durometer or a Shore D durometer had been mounted was used for measuring the hardness. The maximum value was read off as the hardness value.

Surface Hardnesses (Shore C and Shore D Hardnesses) of Inner and Outer Envelope Layer-Encased Spheres. Intermediate Layer-Encased Sphere and Ball The surface hardnesses were measured by perpendicularly pressing an indenter against the surfaces of the respective spheres. The surface hardnesses of the balls (covers) were values measured at dimple-free areas (lands) on the surface of the ball. The P2 Automatic Rubber Hardness Test (Kobunshi Keiki Co., Ltd.) on which a Shore C durometer or a Shore D durometer had been mounted was used for measuring the hardness. The maximum value was read off as the hardness value.

TABLE 4

|  |  | Example 1 | Example 2 | Example 3 | Example 4 | Example 5 | Example 6 | Comparative Example 1 |
|---|---|---|---|---|---|---|---|---|
| Bail construction |  | 5-piece | 5-piece | 5-piece | 5-piece | 5-piece | 5-piece | 4-piece |
| Core | Diameter (mm) | 33.0 | 33.0 | 33.0 | 33.5 | 32.0 | 33.0 | 33.0 |
|  | Weight (g) | 24.0 | 24.0 | 24.0 | 24.9 | 22.5 | 24.0 | 24.0 |
|  | Deflection (mm) | 4.6 | 4.9 | 5.1 | 5.1 | 5.1 | 4.6 | 4.6 |
| Core interior hardness | Surface hardness (Cs) | 78 | 76 | 75 | 75 | 75 | 80 | 78 |
|  | Hardness 2 mm inside surface (Cs-2) | 76 | 74 | 73 | 73 | 73 | 75 | 76 |
|  | Hardness at position midway between envelope layer surface and core center (CM) | 65 | 62 | 62 | 62 | 62 | 65 | 65 |
|  | Hardness at position 5 mm from core center (C5) | 58 | 56 | 55 | 55 | 55 | 56 | 58 |
|  | Core center hardness (Cc) | 53 | 52 | 51 | 51 | 51 | 53 | 53 |
|  | Surface hardness − Center hardness (Cs − Cc) | 25 | 24 | 24 | 24 | 24 | 27 | 25 |
|  | CM − Cc | 11 | 10 | 11 | 11 | 11 | 11 | 11 |
|  | Cs − Cs-2 | 2 | 2 | 2 | 2 | 2 | 6 | 2 |
|  | C5 − Cc | 4 | 4 | 4 | 4 | 4 | 3 | 4 |
|  | [(Core surface hardness + Core center hardness)/2] × Core radius | 1,086 | 1,054 | 1,038 | 1,054 | 1,007 | 1,102 | 1,086 |
| Inner envelope layer | Resin material | No. 1 | No. 1 | No. 1 | No. 1 | No. 1 | No. 1 | No. 1 |
|  | Thickness (mm) | 1.35 | 1.35 | 1.35 | 1.25 | 1.70 | 1.35 | 2.65 |
|  | Material hardness (Shore C hardness) | 74 | 74 | 74 | 74 | 74 | 74 | 74 |
|  | Material hardness (Shore D hardness) | 46 | 46 | 46 | 46 | 46 | 46 | 46 |
| Inner envelope layer-encased sphere | Diameter (mm) | 35.7 | 35.7 | 35.7 | 36.0 | 35.4 | 35.7 | 38.3 |
|  | Weight (g) | 28.9 | 28.9 | 28.9 | 29.4 | 28.3 | 28.9 | 34.2 |
|  | Surface hardness (Shore C hardness) | 82 | 82 | 82 | 82 | 82 | 82 | 82 |
|  | Surface hardness (Shore D hardness) | 52 | 52 | 52 | 52 | 52 | 52 | 52 |
| Inner envelope layer surface hardness (Shore C) × Inner envelope layer thickness (mm) |  | 111 | 111 | 111 | 103 | 140 | 111 | 219 |
| Outer envelope layer | Resin material | No. 2 | No. 2 | No. 2 | No. 2 | No. 2 | No. 2 | — |
|  | Thickness (mm) | 1.30 | 1.30 | 1.30 | 1.15 | 1.55 | 1.30 | — |
|  | Material hardness (Shore C hardness) | 84 | 84 | 84 | 84 | 84 | 84 | — |
|  | Material hardness (Shore D hardness) | 54 | 54 | 54 | 54 | 54 | 54 | — |
| Outer envelope layer-encased sphere | Diameter (mm) | 38.3 | 38.3 | 38.3 | 38.3 | 38.5 | 38.3 | — |
|  | Weight (g) | 34.2 | 34.2 | 34.2 | 34.2 | 34.7 | 34.2 | — |
|  | Surface hardness (Shore C hardness) | 92 | 92 | 92 | 92 | 92 | 92 | — |
|  | Surface hardness (Shore D hardness) | 60 | 60 | 60 | 60 | 60 | 60 | — |
| Outer envelope layer surface hardness (Shore C) × Outer envelope layer thickness (mm) |  | 119 | 119 | 119 | 105 | 142 | 119 | — |

|  |  | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Bail construction |  | 5-piece | 5-piece | 5-piece | 5-piece | 5-piece | 5-piece | 5-piece |
| Core | Diameter (mm) | 33.0 | 33.0 | 33.0 | 33.0 | 33.0 | 33.0 | 27.1 |
|  | Weight (g) | 24.6 | 24.0 | 24.0 | 24.0 | 24.0 | 24.0 | 16.0 |
|  | Deflection (mm) | 4.6 | 4.6 | 4.6 | 4.6 | 3.7 | 4.6 | 4.6 |
| Core interior hardness | Surface hardness (Cs) | 78 | 78 | 78 | 78 | 84 | 78 | 75 |
|  | Hardness 2 mm inside surface (Cs-2) | 76 | 76 | 76 | 76 | 82 | 76 | 73 |
|  | Hardness at position midway between envelope layer surface and core center (CM) | 65 | 65 | 65 | 65 | 69 | 65 | 68 |
|  | Hardness at position 5 mm from core center (C5) | 58 | 58 | 58 | 58 | 62 | 58 | 57 |
|  | Core center hardness (Cc) | 53 | 53 | 53 | 53 | 57 | 53 | 53 |
|  | Surface hardness − Center hardness (Cs − Cc) | 25 | 25 | 25 | 25 | 27 | 25 | 22 |

TABLE 4-continued

|  |  |  |  |  |  |  |  |  |
|---|---|---|---|---|---|---|---|---|
|  | CM − Cc | 11 | 11 | 11 | 11 | 12 | 11 | 15 |
|  | Cs − Cs-2 | 2 | 2 | 2 | 2 | 2 | 2 | 2 |
|  | C5 − Cc | 4 | 4 | 4 | 4 | 5 | 4 | 4 |
|  | [(Core surface hardness + Core center hardness)/2] × Core radius | 1,086 | 1,086 | 1,086 | 1,086 | 1,168 | 1,086 | 869 |
| Inner envelope layer | Resin material | No. 1 | No. 2 | No. 1 | No. 1 | No. 1 | No. 1 | No. 1 |
|  | Thickness (mm) | 1.35 | 1.35 | 1.35 | 1.35 | 1.35 | 1.35 | 2.80 |
|  | Material hardness (Shore C hardness) | 74 | 84 | 74 | 74 | 74 | 74 | 74 |
|  | Material hardness (Shore D hardness) | 46 | 54 | 46 | 46 | 46 | 46 | 46 |
| Inner envelope layer-encased sphere | Diameter (mm) | 35.7 | 35.7 | 35.7 | 35.7 | 35.7 | 35.7 | 32.7 |
|  | Weight (g) | 29.4 | 28.9 | 28.9 | 28.9 | 28.9 | 28.9 | 23.6 |
|  | Surface hardness (Shore C hardness) | 82 | 92 | 82 | 82 | 82 | 82 | 82 |
|  | Surface hardness (Shore D hardness) | 52 | 60 | 52 | 52 | 52 | 52 | 52 |
| Inner envelope layer surface hardness (Shore C) × Inner envelope layer thickness (mm) |  | 111 | 124 | 111 | 111 | 111 | 111 | 231 |
| Outer envelope layer | Resin material | No. 2 | No. 1 | No. 4 | No. 3 | No. 2 | No. 3 | No. 2 |
|  | Thickness (mm) | 1.30 | 1.30 | 1.30 | 1.30 | 1.30 | 1.30 | 2.80 |
|  | Material hardness (Shore C hardness) | 84 | 74 | 95 | 78 | 84 | 78 | 84 |
|  | Material hardness (Shore D hardness) | 54 | 46 | 67 | 49 | 54 | 49 | 54 |
| Outer envelope layer-encased sphere | Diameter (mm) | 38.3 | 38.3 | 38.3 | 38.3 | 38.3 | 38.3 | 38.3 |
|  | Weight (g) | 34.8 | 34.2 | 34.2 | 34.2 | 34.2 | 34.2 | 34.2 |
|  | Surface hardness (Shore C hardness) | 92 | 82 | 100 | 86 | 92 | 86 | 92 |
|  | Surface hardness (Shore D hardness) | 60 | 52 | 74 | 55 | 60 | 55 | 60 |
| Outer envelope layer surface hardness (Shore C) × Outer envelope layer thickness (mm) |  | 119 | 107 | 130 | 112 | 119 | 112 | 257 |

TABLE 5

|  |  | Example | | | | | | Comparative Example |
|---|---|---|---|---|---|---|---|---|
|  |  | 1 | 2 | 3 | 4 | 5 | 6 | 1 |
| Intermediate layer | Resin material | No. 4 | No. 4 | No. 4 | No. 4 | No. 4 | No. 4 | No. 4 |
|  | Thickness (mm) | 1.40 | 1.40 | 1.40 | 1.40 | 1.30 | 1.40 | 1.40 |
|  | Material hardness (Shore C hardness) | 95 | 95 | 95 | 95 | 95 | 95 | 95 |
|  | Material hardness (Shore D hardness) | 67 | 67 | 67 | 67 | 67 | 67 | 67 |
| Intermediate layer-encased sphere | Diameter (mm) | 41.1 | 41.1 | 41.1 | 41.1 | 41.1 | 41.1 | 41.1 |
|  | Weight (g) | 40.9 | 40.9 | 40.9 | 40.9 | 40.9 | 40.9 | 40.9 |
|  | Surface hardness (Shore C hardness) | 100 | 100 | 100 | 100 | 100 | 100 | 100 |
|  | Surface hardness (Shore D hardness) | 74 | 74 | 74 | 74 | 74 | 74 | 74 |
| Intermediate layer surface hardness (Shore C) × Intermediate layer thickness (mm) |  | 140 | 140 | 140 | 140 | 130 | 140 | 140 |
| Cover | Resin material | No. 5 | No. 5 | No. 5 | No. 6 | No. 6 | No. 5 | No. 5 |
|  | Thickness (mm) | 0.80 | 0.80 | 0.80 | 0.80 | 0.80 | 0.80 | 0.80 |
|  | Specific gravity | 1.12 | 1.12 | 1.12 | 1.12 | 1.12 | 1.12 | 1.12 |
|  | Material hardness (Shore C hardness) | 63 | 63 | 63 | 68 | 68 | 63 | 63 |
|  | Material hardness (Shore D hardness) | 40 | 40 | 40 | 43 | 43 | 40 | 40 |
| Coating layer | Material | I | I | I | I | I | I | I |
|  | Shore C hardness: Hc | 63 | 63 | 63 | 63 | 63 | 63 | 63 |
| Ball | Diameter (mm) | 42.7 | 42.7 | 42.7 | 42.7 | 42.7 | 42.7 | 42.7 |
|  | Weight (g) | 45.6 | 45.6 | 45.6 | 45.6 | 45.6 | 45.6 | 45.6 |
|  | Surface hardness (Shore C hardness) | 85 | 85 | 85 | 87 | 87 | 85 | 85 |
|  | Surface hardness (Shore D hardness) | 58 | 58 | 58 | 60 | 60 | 58 | 58 |

TABLE 5-continued

| | | | | | | | |
|---|---|---|---|---|---|---|---|
| Ball surface hardness (Shore C) × Cover thickness (mm) | 68 | 68 | 68 | 69 | 69 | 68 | 68 |
| (Ball surface hardness × Cover thickness) + (Intermediate layer surface hardness × Intermediate layer thickness) + (Outer envelope layer surface hardness × Outer envelope layer thickness) + (Inner envelope layer surface hardness × Inner envelope layer thickness) [Hardness: Shore C] | 439 | 439 | 439 | 418 | 482 | 439 | 427 |
| [(Core surface hardness + Core center hardness)/2] × Core radius | 1,086 | 1,054 | 1,038 | 1,054 | 1,007 | 1,102 | 1,086 |
| Inner envelope layer surface hardness − Core center hardness (Shore C hardness) | 29 | 31 | 31 | 31 | 31 | 29 | 29 |
| Outer envelope layer surface hardness − Core center hardness (Shore C hardness) | 38 | 40 | 41 | 41 | 41 | 38 | — |
| Intermediate layer surface hardness − Core center hardness (Shore C hardness) | 47 | 48 | 49 | 49 | 49 | 47 | 47 |
| Inner envelope layer surface hardness − Core surface hardness (Shore C hardness) | 4 | 6 | 8 | 8 | 8 | 2 | 4 |
| Outer envelope layer surface hardness − Inner envelope layer surface hardness (Shore C hardness) | 9 | 9 | 9 | 9 | 9 | 9 | — |
| Intermediate layer surface hardness − Outer envelope layer surface hardness (Shore C hardness) | 8 | 8 | 8 | 8 | 8 | 8 | — |
| Ball surface hardness − Intermediate layer surface hardness (Shore C hardness) | −15 | −15 | −15 | −13 | −13 | −15 | −15 |
| Material hardness of cover − Material hardness of coating (Shore C hardness) | 1 | 1 | 1 | 5 | 5 | 1 | 1 |
| (Outer envelope layer surface hardness − Core center hardness)/(CM − Cc) | 3.4 | 3.9 | 3.6 | 3.6 | 3.7 | 3.4 | 2.6 |

| | | Comparative Example | | | | | | |
|---|---|---|---|---|---|---|---|---|
| | | 2 | 3 | 4 | 5 | 6 | 7 | 8 |
| Intermediate layer | Resin material | No. 4 | No. 4 | No. 2 | No. 2 | No. 4 | No. 4 | No. 4 |
| | Thickness (mm) | 1.20 | 1.40 | 1.40 | 1.40 | 1.40 | 1.40 | 1.40 |
| | Material hardness (Shore C hardness) | 95 | 95 | 84 | 84 | 95 | 95 | 95 |
| | Material hardness (Shore D hardness) | 67 | 67 | 54 | 54 | 67 | 67 | 67 |
| Intermediate layer-encased sphere | Diameter (mm) | 40.7 | 41.1 | 41.1 | 41.1 | 41.1 | 41.1 | 41.1 |
| | Weight (g) | 40.4 | 40.9 | 40.9 | 40.9 | 40.9 | 40.9 | 40.9 |
| | Surface hardness (Shore C hardness) | 100 | 100 | 92 | 92 | 100 | 100 | 100 |
| | Surface hardness (Shore D hardness) | 74 | 74 | 60 | 60 | 74 | 74 | 74 |
| Intermediate layer surface hardness (Shore C) × Intermediate layer thickness (mm) | | 120 | 140 | 128 | 128 | 140 | 140 | 140 |
| Cover | Resin material | No. 8 | No. 5 | No. 5 | No. 7 | No. 5 | No. 5 | No. 5 |
| | Thickness (mm) | 1.00 | 0.80 | 0.80 | 0.80 | 0.80 | 0.80 | 0.80 |
| | Specific gravity | 0.98 | 1.12 | 1.12 | 1.12 | 1.12 | 1.12 | 1.12 |
| | Material hardness (Shore C hardness) | 63 | 63 | 63 | 85 | 63 | 63 | 63 |
| | Material hardness (Shore D hardness) | 40 | 40 | 40 | 56.5 | 40 | 40 | 40 |
| Coating layer | Material | I | I | I | I | I | I | I |
| | Shore C hardness: Hc | 63 | 63 | 63 | 63 | 63 | 63 | 63 |
| Ball | Diameter (mm) | 42.7 | 42.7 | 42.7 | 42.7 | 42.7 | 42.7 | 42.7 |
| | Weight (g) | 45.6 | 45.6 | 45.6 | 45.6 | 45.6 | 45.6 | 45.6 |
| | Surface hardness (Shore C hardness) | 83 | 85 | 85 | 95 | 85 | 85 | 85 |
| | Surface hardness (Shore D hardness) | 58 | 58 | 58 | 64 | 58 | 58 | 58 |
| Ball surface hardness (Shore C) × Cover thickness (mm) | | 83 | 68 | 68 | 76 | 68 | 68 | 68 |
| (Ball surface hardness × Cover thickness) + (Intermediate layer surface hardness × Intermediate layer thickness) + (Outer envelope layer surface hardness × Outer envelope layer thickness) + (Inner envelope layer surface hardness × Inner envelope layer thickness) [Hardness: Shore C] | | 434 | 439 | 438 | 427 | 439 | 431 | 696 |
| [(Core surface hardness + Core center hardness)/2] × Core radius | | 1,086 | 1,086 | 1,086 | 1,086 | 1,168 | 1,086 | 869 |

TABLE 5-continued

| | | | | | | | |
|---|---|---|---|---|---|---|---|
| Inner envelope layer surface hardness − Core center hardness (Shore C hardness) | 29 | 38 | 29 | 29 | 25 | 29 | 29 |
| Outer envelope layer surface hardness − Core center hardness (Shore C hardness) | 38 | 29 | 47 | 33 | 34 | 32 | 38 |
| Intermediate layer surface hardness − Core center hardness (Shore C hardness) | 47 | 47 | 38 | 38 | 43 | 47 | 47 |
| Inner envelope layer surface hardness − Core surface hardness (Shore C hardness) | 4 | 13 | 4 | 4 | −2 | 4 | 7 |
| Outer envelope layer surface hardness − Inner envelope layer surface hardness (Shore C hardness) | 9 | −9 | 18 | 4 | 9 | 3 | 9 |
| Intermediate layer surface hardness − Outer envelope layer surface hardness (Shore C hardness) | 8 | 18 | −8 | 6 | 8 | 14 | 8 |
| Ball surface hardness − Intermediate layer surface hardness (Shore C hardness) | −17 | −15 | −6 | 3 | −15 | −15 | −15 |
| Material hardness of cover − Material hardness of coating (Shore C hardness) | 1 | 1 | 1 | 22 | 1 | 1 | 1 |
| (Outer envelope layer surface hardness − Core center hardness)/(CM − Cc) | 3.4 | 2.6 | 4.2 | 2.9 | 3.0 | 2.9 | 2.6 |

Figure 2:
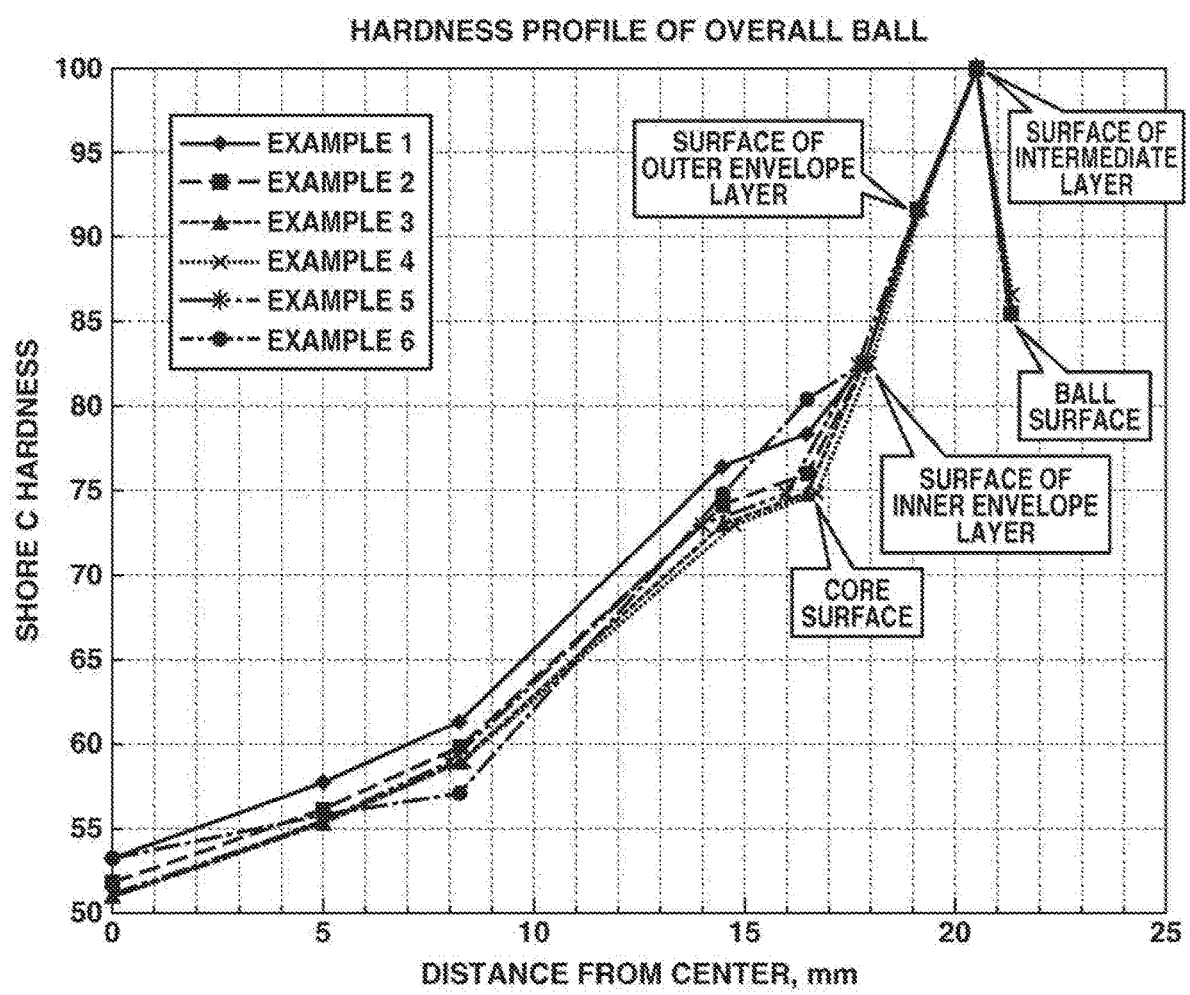
FIG. 2 is a graph showing the hardness profile at the interior of the balls obtained in the Examples of the invention.

FIG. 2 shows a graph of the internal hardness profiles for the balls obtained in Examples 1 to 6.

The flight performance (W #1 and I #6), spin rate on approach shots, durability to repeated impact and scuff resistance of each golf ball were evaluated by the following methods. The results are shown in Table 6.

Flight Performance (W #1)

A driver (W #1) was mounted on a golf swing robot and the distance traveled by the ball when struck at a head speed of 47 m/s was measured and rated according to the criteria shown below. The club used was the TOUR B XD-3 manufactured by Bridgestone Sports Co., Ltd. In addition, using an apparatus for measuring the initial conditions, the spin rate was measured immediately after the ball was similarly struck.

Rating Criteria
  Good: Total distance was 239.0 or more
  Fair: Total distance was at least 238.0 m and up to 238.9 m
  NG: Total distance was less than 238.0 m Flight Performance (I #6)

A driver (I #6) was mounted on a golf swing robot and the distance traveled by the ball when struck at a head speed of 44 m/s was measured and rated according to the criteria shown below. The club used was the TOUR B X-CB manufactured by Bridgestone Sports Co., Ltd. In addition, using an apparatus for measuring the initial conditions, the spin rate was measured immediately after the ball was similarly struck.

Rating Criteria
  Good: Total distance was 175.5 m or more
  Fair: Total distance was at least 175.1 m and up to 175.4 m
  NG: Total distance was less than 175.1 m Evaluation of Spin Rate on Approach Shots A sand wedge (SW) was mounted on a golf swing robot and the amount of spin by the ball when struck at a head speed of 21 m/s was rated according to the criteria shown below. The sand wedge (SW) was the Tour B XW-1 manufactured by Bridgestone Sports Co., Ltd.

Rating Criteria:
  Good: Spin rate was 6,300 rpm or more
  Fair: Spin rate was at least 6,000 rpm but less than 6,300 rpm
  NG: Spin rate was less than 6,000 rpm Durability to Repeated Impact Ten sample balls (N=10) from each Example were repeatedly struck with a driver (W #1) at a head speed of 45 m/s and the durability was rated as follows. The number of shots after which a ball began to crack was counted for each of the ten balls. Of these balls, the three balls having the lowest number of shots on cracking were selected and the average number of shots on cracking for the three balls was treated as the "number of shots on cracking" for that Example. Durability indexes were determined for each Example based on a durability index of 100 for the number of shots on cracking in Example 3.

Rating Criteria:
  Good: Durability index was 80 or more
  NG: Durability index was less than 80

Scuff Resistance

A non-plated pitching sand wedge having a loft angle of 52° was set in a swing robot and the ball was hit once at a head speed (HS) of 40 m/s, following which the surface state of the ball was visually examined and rated as follows.

Rating Criteria:
  Good: Scuffing resistance was comparable to or better than that in Example 1
  Fair: Scuffing was slightly greater than in Example 1
  NG: Scuffing was clearly more pronounced than in Example 1

TABLE 6

| | | Example | | | | | | Comparative Example |
|---|---|---|---|---|---|---|---|---|
| | | 1 | 2 | 3 | 4 | 5 | 6 | 1 |
| Flight (W#1: HS = 47 m/s) | Spin rate (rpm) | 2,753 | 2,736 | 2,727 | 2,740 | 2,755 | 2,739 | 2,844 |
| | Total distance (m) | 239.8 | 239.8 | 239.7 | 239.0 | 239.3 | 240.1 | 237.8 |
| | Rating | Good | Good | Good | Good | Good | Good | NG |
| Flight (I#6: | Spin rate (rpm) | 5,055 | 5,001 | 4,974 | 4,942 | 5,024 | 4,987 | 5,239 |

TABLE 6-continued

| | | | | | | | | |
|---|---|---|---|---|---|---|---|---|
| HS = 44 m/s) | Total distance (m) | 175.5 | 176.0 | 176.2 | 176.8 | 176.2 | 176.4 | 174.2 |
| | Rating | Good | Good | Good | Good | Good | Good | NG |
| Controllability on approach shots (SW: HS = 21 m/s) | Spin rate (rpm) | 6,370 | 6,338 | 6,321 | 6,308 | 6,358 | 6,370 | 6,331 |
| | Rating | Good | Good | Good | Good | Good | Good | Good |
| Durability to repeated impact | Rating | Good | Good | Good | Good | Good | Fair | Good |
| Scuff resistance | Rating | Good | Good | Good | Good | Good | Good | Good |

| | | Comparative Example | | | | | | |
|---|---|---|---|---|---|---|---|---|
| | | 2 | 3 | 4 | 5 | 6 | 7 | 8 |
| Flight (W#1: HS = 47 m/s) | Spin rate (rpm) | 2,828 | 2,837 | 2,888 | 2,740 | 2,867 | 2,872 | 2,968 |
| | Total distance (m) | 237.3 | 238.3 | 237.9 | 239.0 | 239.2 | 238.8 | 237.6 |
| | Rating | NG | Fair | NG | Good | Good | Fair | NG |
| Flight (I#6: HS = 44 m/s) | Spin rate (rpm) | 5,171 | 5,215 | 5,288 | 5,224 | 5,196 | 5,109 | 5,260 |
| | Total distance (m) | 174.8 | 174.3 | 173.8 | 174.3 | 174.1 | 175.1 | 173.5 |
| | Rating | NG | NG | NG | NG | NG | Fair | NG |
| Controllability on approach shots (SW: HS = 21 m/s) | Spin rate (rpm) | 6,233 | 6,370 | 6,360 | 5,895 | 6,455 | 6,321 | 6,494 |
| | Rating | Fair | Good | Good | NG | Good | Good | Good |
| Durability to repeated impact | Rating | Good | Good | Good | Good | Good | Good | Good |
| Scuff resistance | Rating | NG | Good | Good | Fair | Good | Good | Good |

As demonstrated by the results in Table 6, the golf balls of Comparative Examples 1 to 8 are inferior in the following respects to the golf balls according to the present invention that are obtained in the Examples.

The golf ball in Comparative Example 1 is a four-piece golf ball that had a single envelope layer. The spin rates on full shots with a driver (W #1) and on full shots with a middle iron (I #6) are high, and so a satisfactory distance is not achieved.

In Comparative Example 2, the cover is formed of ionomer resins. The scuff resistance is poor. In addition, the spin rates on full shots with a driver (W #1) and on full shots with a middle iron (I #6) are high, and so a satisfactory distance is not achieved.

In Comparative Example 3, the surface hardness of the inner envelope layer is higher than the surface hardness of the outer envelope layer. The spin rates on full shots with a driver (W #1) and on full shots with a middle iron (I #6) are high, and so a satisfactory distance is not achieved.

In Comparative Example 4, the surface hardness of the outer envelope layer is higher than the surface hardness of the intermediate layer. The spin rates on full shots with a driver (W #1) and on full shots with a middle iron (I #6) are high, and so a satisfactory distance is not achieved.

In Comparative Example 5, the surface hardness of the ball is higher than the surface hardness of the intermediate layer. The spin rate on approach shots is insufficient. In addition, the spin rate on full shots with a middle iron (I #6) is high, and so a satisfactory distance is not achieved.

In Comparative Example 6, the Shore C hardness value obtained by subtracting the core center hardness from the surface hardness of the outer envelope layer is lower than 36. Also, the spin rate on full shots with a middle iron (I #6) is high, and so a satisfactory distance is not achieved.

In Comparative Example 7, the value obtained by subtracting the core center hardness from the surface hardness of the outer envelope layer is lower than 36. Also, the spin rates on full shots with a driver (W #1) and on full shots with a middle iron (I #6) are high, and so a satisfactory distance is not achieved.

In Comparative Example 8, the core diameter is less than 30 mm. The spin rates on full shots with a driver (W #1) and on full shots with a middle iron (I #6) are high, and so a satisfactory distance is not achieved.

Japanese Patent Application No. 2019-161361 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A multi-piece solid golf ball comprising a core, an envelope layer, an intermediate layer and a cover, wherein the core is formed primarily of a base rubber and has a diameter of at least 30 mm; the envelope layer and the intermediate layer are each formed of a resin material and the cover is formed primarily of a urethane resin; the envelope layer is formed into two layers—an inner layer and an outer layer; the core has a center hardness and a surface hardness, the sphere obtained by encasing the core with the inner envelope layer (inner envelope layer-encased sphere) has a surface hardness, the sphere obtained by encasing the inner envelope layer-encased sphere with the outer envelope layer (outer envelope layer-encased sphere) has a surface hardness, the sphere obtained by encasing the outer envelope layer-encased sphere with the intermediate layer (intermediate layer-encased sphere) has a surface hardness and the ball has a surface hardness which together satisfy the following relationship in which the hardnesses are Shore C hardness values:

> core center hardness<core surface hardness<surface hardness of inner envelope layer-encased sphere<surface hardness of outer envelope layer-encased sphere<surface hardness of intermediate layer-encased sphere>ball surface hardness;

and the Shore C hardness value obtained by subtracting the core center hardness from the surface hardness of the outer envelope layer-encased sphere is 36 or more, and wherein the core is formed of a rubber composition comprising:

(a) a base rubber,
(b) a co-crosslinking agent that is an α,β-unsaturated carboxylic acid or a metal salt thereof or both,
(c) a crosslinking initiator, and
(d) a lower alcohol having a molecular weight of less than 200.

2. The golf ball of claim 1, wherein the hardnesses (Shore C hardness) of the respective encased spheres and the thicknesses (mm) of the respective layers satisfy the following relationship:

(surface hardness of ball×cover thickness)+(surface hardness of intermediate layer-encased sphere× intermediate layer thickness)+(surface hardness of outer envelope layer-encased sphere×thickness of outer envelope layer)+(surface hardness of inner envelope layer-encased sphere×thickness of inner envelope layer)≤[(surface hardness of core+center hardness of core)/2]×core radius.

3. The golf ball of claim 2, wherein the sum expressed as (surface hardness of ball×cover thickness)+(surface hardness of intermediate layer-encased sphere×intermediate layer thickness)+(surface hardness of outer envelope layer-encased sphere×thickness of outer envelope layer)+(surface hardness of inner envelope layer-encased sphere×thickness of inner envelope layer) has a value of from 300 to 600.

4. The golf ball of claim 1, wherein the surface hardnesses of the core and the inner envelope layer-encased sphere satisfy the following condition:

1≤surface hardness of inner envelope layer-encased sphere−surface hardness of core≤20.

5. The golf ball of claim 1, wherein the surface hardnesses of the inner envelope layer-encased sphere and the outer envelope layer-encased sphere satisfy the following condition:

1≤surface hardness of outer envelope layer-encased sphere−surface hardness of inner envelope layer-encased sphere≤20.

6. The golf ball of claim 1, wherein the surface hardnesses of the outer envelope layer-encased sphere and the intermediate layer-encased sphere satisfy the following condition:

1≤surface hardness of intermediate layer-encased sphere−surface hardness of outer envelope layer-encased sphere≤20.

7. The golf ball of claim 1, wherein the core has an interior hardness which, letting Cc be the Shore C hardness at the core center, C5 be the Shore C hardness at a position 5 mm from the core center, Cs be the Shore C hardness at the core surface and Cs-2 be the Shore C hardness at a position 2 mm inside the core surface, satisfies the following condition:

$Cs-Cc \geq 13$.

8. The golf ball of claim 7, wherein the interior hardness of the core further satisfies the following condition:

$Cs-Cs\text{-}2 \leq 4$.

9. The golf ball of claim 7, wherein the interior hardness of the core further satisfies the following condition:

$C5-Cc \geq Cs-Cs\text{-}2$.

10. The golf ball of claim 1, wherein the content of component (d) is from 0.5 to 5 parts by weight per 100 parts by weight of the base rubber (a).

11. The golf ball of claim 1, wherein component (d) is a monohydric, dihydric or trihydric alcohol.

12. The golf ball of claim 1, wherein component (d) is butanol, glycerol, ethylene glycol or propylene glycol.

* * * * *